(12) United States Patent
Scalabrino

(10) Patent No.: US 12,547,970 B1
(45) Date of Patent: *Feb. 10, 2026

(54) VARIABLE DELIVERY FEE BASED ON CONGESTION

(71) Applicant: WALGREEN CO., Deerfield, IL (US)

(72) Inventor: Vince Scalabrino, Palatine, IL (US)

(73) Assignee: WALGREEN CO., Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/519,424

(22) Filed: Nov. 27, 2023

Related U.S. Application Data

(63) Continuation of application No. 16/905,152, filed on Jun. 18, 2020, now Pat. No. 11,853,957.

(Continued)

(51) Int. Cl.
*G06Q 10/0834* (2023.01)
*G06N 20/00* (2019.01)

(Continued)

(52) U.S. Cl.
CPC ....... *G06Q 10/08345* (2013.01); *G06N 20/00* (2019.01); *G06Q 10/0838* (2013.01); *G06Q 30/0283* (2013.01)

(58) Field of Classification Search
CPC ......... G06Q 10/08345; G06Q 10/0838; G06Q 30/0283; G06N 20/00

(Continued)

(56) References Cited

U.S. PATENT DOCUMENTS

| | | | |
|---|---|---|---|
| 8,005,761 B1 * | 8/2011 | Braumoeller | G06Q 10/087 705/332 |
| 10,043,148 B1 | 8/2018 | Chowdhary | |

(Continued)

FOREIGN PATENT DOCUMENTS

WO   WO-2020170216 A1 *   8/2020   .......... G06Q 10/047

OTHER PUBLICATIONS

Bhargava et al. "A best-matching protocol for order fulfillment in re-configurable supply networks". Computers in Industry, vol. 82, pp. 160-169. https://doi.org/10.1016/j.compind.2016.07.001. (Year: 2016).*

(Continued)

*Primary Examiner* — Rupangini Singh
*Assistant Examiner* — Lisa Ma
(74) *Attorney, Agent, or Firm* — MARSHALL, GERSTEIN & BORUN LLP

(57) ABSTRACT

Systems and methods relating to management of delivery fleets are disclosed. Such systems and methods include using functionally-aligned machine learning engines to manage aspects of fleet dispatch and routing, inventory level adjustments, and order optimization. The techniques may be applied to manage an automated fleet delivery services system controlling a fleet of autonomous delivery devices (e.g., UAVs) to deliver products from a plurality of distribution hubs to fulfil customer orders. The interconnected machine learning engines enable efficient management of various aspects of such automated fleet delivery services in real time, including optimization of fleet distribution, optimization of inventory distribution, and optimization of order distribution. Optimization of order distribution may be obtained by dynamically adjusting delivery charges for orders based upon current fleet capacity and inventory levels.

20 Claims, 8 Drawing Sheets

Related U.S. Application Data

(60) Provisional application No. 62/984,241, filed on Mar. 2, 2020.

(51) Int. Cl.
   *G06Q 10/083* (2024.01)
   *G06Q 30/0283* (2023.01)

(58) Field of Classification Search
   USPC .......................................................... 705/335
   See application file for complete search history.

(56) References Cited

U.S. PATENT DOCUMENTS

| | | | |
|---|---|---|---|
| 10,538,190 B1 | 1/2020 | Metellus et al. | |
| 10,769,588 B1* | 9/2020 | Kim | H04N 21/44222 |
| 10,872,370 B2 | 12/2020 | Parks, Jr. et al. | |
| 2010/0125486 A1 | 5/2010 | Sinclair et al. | |
| 2015/0051941 A1 | 2/2015 | Bell | |
| 2016/0307155 A1 | 10/2016 | Bell | |
| 2017/0116566 A1* | 4/2017 | Walton | G06Q 10/087 |
| 2017/0154347 A1* | 6/2017 | Bateman | G06Q 10/067 |
| 2018/0314999 A1 | 11/2018 | Nemati et al. | |
| 2019/0172122 A1 | 6/2019 | Wenger et al. | |
| 2019/0197475 A1 | 6/2019 | Bianconcini et al. | |
| 2019/0347614 A1 | 11/2019 | Khasis | |
| 2020/0143319 A1* | 5/2020 | Fu | G06N 5/01 |
| 2020/0160268 A1* | 5/2020 | Han | G06N 3/0499 |
| 2021/0035202 A1 | 2/2021 | Suzuki et al. | |
| 2023/0112290 A1* | 4/2023 | Ye | G06Q 10/06315 705/7.25 |
| 2024/0185172 A1* | 6/2024 | Delchev | G06Q 30/0206 |

OTHER PUBLICATIONS

European Patent Application No. 21160352, European Search Report, dated Jun. 14, 2021.

Non-Final Office Action for U.S. Appl. No. 16/905,152 dated Nov. 30, 2022.

Final Office Action for U.S. Appl. No. 16/905,152 dated Apr. 14, 2023.

Non-Final Office Action for U.S. Appl. No. 16/905,152 dated Nov. 8, 2021.

Final Office Action for U.S. Appl. No. 16/905,152 dated May 31, 2022.

Notice of Allowance for U.S. Appl. No. 16/905,152 dated Aug. 18, 2023.

Louis Columbus, 10 Ways Machine Learning Is Revolutionizing Supply Chain Management, Jun. 11, 2018, Forbes, https://www.forbes.com/sites/louiscolumbus/2018/06/11/10-ways-machine-learning-is-revolutionizing-supply-chain-management/?sh=c3c81263e370 (accessed Jul. 29, 2023) (Year: 2018).

European Patent Application No. 21160352.7, European Examination Report, dated Nov. 11, 2023.

* cited by examiner

VARIABLE DELIVERY FEE BASED ON CONGESTION

CROSS REFERENCE TO RELATED APPLICATION

This application is a continuation of U.S. application Ser. No. 16/905,152, filed Jun. 18, 2020, which claims the benefit under 35 U.S.C. § 119 (c) of U.S. Provisional Patent Application Ser. No. 62/984,241, filed Mar. 2, 2020, the entire disclosures of which are incorporated herein by reference.

TECHNICAL FIELD

The present disclosure generally relates to systems and methods for managing automated delivery services using fleets of autonomous delivery devices (e.g., unmanned aerial vehicles (UAVs)) to deliver goods to consumers, as well as managing orders for delivery of goods by such fleets of autonomous devices.

BACKGROUND

Modern e-commerce systems take orders from consumers via electronic catalogs and dispatch the ordered goods from distribution centers or hubs for delivery to customer residences, worksites, or other designated locations. Such systems offer consumers a greater selection of goods, greater convenience through product delivery, and often lower prices than making similar purchases at traditional "brick-and-mortar" retail shops. With the growth of online retail shopping, delivery systems have become more sophisticated. Currently, delivery typically involves placing the ordered goods into packages at a local distribution center, labeling the packages with corresponding delivery addresses, assigning the packages to a distribution route, loading the packages into a delivery truck or van, and having a driver of the delivery truck or van deliver the packages to the addresses indicated on their labels. Some delivery routes are fixed, while other delivery routes may be adjusted based upon the delivery locations of the packages. Goods are also often distributed between distribution hubs and sent from regional distribution hubs to local distribution centers.

Although existing distribution systems have become highly efficient relative to previous distribution systems, delivery is nonetheless delayed by days and introduces multiple points where human error may delay or prevent delivery. Such problems are compounded during times of peak demand, such as during holiday shopping seasons. Additionally, such package delivery creates surface traffic congestion due to the number of delivery vehicles driving delivery routes and further due to the frequent stops such delivery vehicles make to deliver packages. For these reasons, alternative delivery systems using fleets of autonomous delivery devices (particularly UAVs) are being developed. However, systems for effectively managing such fleets are needed.

SUMMARY

The present embodiments relate to managing delivery of customer orders for products using fleets of autonomous delivery devices. Some embodiments relate to management of delivery demand by dynamic adjustment of prices associated with delivery charges in response to delivery demand and availability of the autonomous delivery devices. Additional, fewer, or alternative features described herein below may be included in some aspects.

In one aspect, a computer-implemented method for managing an autonomous delivery device fleet for delivering packages may be provided. The method may include: receiving, at an order management engine, an order from a customer indicating one or more products to be delivered to a delivery location associated with the customer; sending, from the order management engine to a fleet management engine, order data regarding a plurality of orders associated with a plurality of delivery locations associated with a plurality of customers; obtaining, by the fleet management engine from an inventory management engine, inventory data regarding availability of a plurality of products at a plurality of delivery hubs; generating, by the fleet management engine, a distribution plan for controlling a plurality of autonomous delivery devices of the autonomous delivery device fleet to deliver the plurality of products associated with the plurality of orders, the distribution plan including a delivery plan for an autonomous device of the autonomous delivery device fleet to deliver the one or more products of the order to the delivery location associated with the customer; and sending, by the fleet management engine to the autonomous delivery device, an indication of the delivery plan to cause the autonomous delivery device to deliver the one or more products of the order to the delivery location associated with the customer.

In another aspect, a computer-implemented method for adjusting order delivery fees may be provided. The method may include: receiving one or more sets of order data including order details and customer details; receiving one or more sets of delivery data including data regarding fleet availability at the time of each order; utilizing the one or more sets of order data and the one or more sets of delivery data as training data for a machine learning (ML) model to train the ML model to determine a combination of optimal order delivery fees and delivery times based on the delivery data; analyzing a particular set of order data with the ML model, including determining an optimal order delivery fee based on particular delivery data associated with the particular order data to provide order fulfilment within certain time intervals; and communicating to the customer options of combinations of variable delivery fees and delivery times.

Systems or computer-readable media storing instructions for implementing all or part of the methods described above may also be provided in some aspects. Systems for implementing such methods may include one or more of the following: autonomous delivery devices, delivery network servers, or secure networks. Program memories of the delivery network servers may store computer-readable instructions to cause the one or more processors to implement part or all of the method described above. In some embodiments, such computer-readable instructions may cause the delivery network servers to implement one or more fleet management engines, order management engines, or inventory management engines.

BRIEF DESCRIPTION OF DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The Figures described below depict various aspects of the applications, methods, and systems disclosed herein. It should be understood that each Figure depicts an embodiment of a particular aspect of the disclosed applications, systems and methods, and that each of the Figures is intended to accord with one or more possible embodiments thereof. Furthermore, wherever possible, the following description refers to the reference numerals included in the following Figures, in which features depicted in multiple Figures are designated with consistent reference numerals.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Delivery services using fleets of autonomous delivery devices for fulfilling customer orders have the potential to provide delivery of orders within minutes or hours of the time a customer places an order. However, the speed of order delivery and the scale at which such systems may operate at times of peak demand create problems of coordinating and optimizing resource use to ensure acceptable delivery times for customers. Additionally, inventory must be carefully managed across many distribution hubs to ensure availability for rapid delivery. Existing order delivery techniques are inadequate for autonomous delivery fleets because they (i) rely upon scheduled delivery routes that delay delivery, rather than providing continuous delivery, (ii) inefficiently dispatch each order on a first-in, first-out basis that produces significant delays during peak demand periods, or (iii) rely upon the judgment of human operators to specify each delivery route on a continuous basis, thereby introducing significant variability and delay into systems as the number of customer orders increases. The techniques disclosed herein solve these problems by providing interconnected functionally-aligned data engines powered by machine learning models to automate the management of automated delivery services using fleets of autonomous delivery devices.

Figure 1:
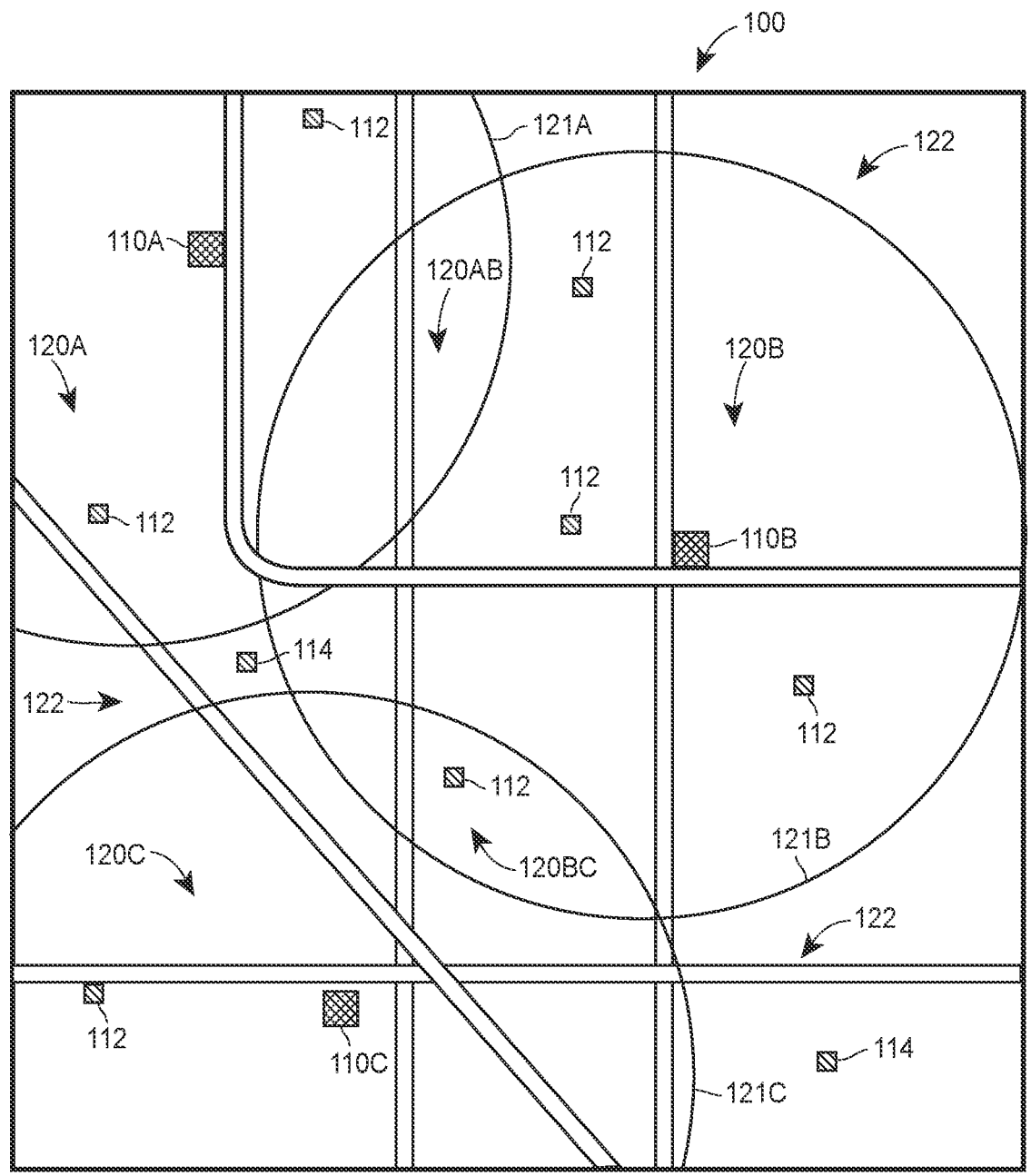
FIG. 1 illustrates a map of an exemplary local area for automated fleet delivery services.

FIG. 1 illustrates a map of an exemplary local area 100 for automated fleet delivery services, according to the various embodiments described herein. The local area 100 includes a plurality of delivery hubs 110 from which goods are dispatched for delivery to a plurality of delivery locations 112. Each of the delivery hubs 110 stores a supply of goods that may be ordered and delivered to delivery locations 112 within the corresponding delivery area 120 of the delivery hub 110. The extent of each delivery area 120 is defined by a corresponding delivery area boundary 121. Thus, delivery hub 110A has a delivery area 120A that extends around delivery hub 110A within the delivery area boundary 121A. Likewise, delivery hub 110B has a delivery area 120B that extends around delivery hub 110B within the delivery area boundary 121B, and delivery hub 110C has a delivery area 120C that extends around delivery hub 110C within the delivery area boundary 121C. Although the delivery area boundaries 121 are illustrated as being circles centered at their corresponding delivery hubs 110, it should be understood that the delivery area boundaries 121 may take any shape. For example, buildings, geological features, power lines, or airspace restrictions may cause certain areas to be excluded from the delivery areas 120 or may be used to define the delivery area boundaries 121. In some embodiments, the delivery area boundaries 121 may be adjusted based at least in part upon historical or predicted demand at various locations in order to balance the load on the autonomous fleets associated with the various delivery hubs 110.

In some embodiments, delivery areas 120 may overlap, such that some portions of the local area 100 may be served by multiple delivery hubs 110. As illustrated, overlapping delivery area 120AB is within the delivery areas of delivery hubs 110A and 110B, such that goods may be delivered to locations within the overlapping delivery area 120AB from either delivery hub 110A or delivery hub 110B. Likewise, overlapping delivery area 120BC is within the delivery areas of delivery hubs 110B and 110C, such that goods may be delivered to locations within the overlapping delivery area 120BC from either delivery hub 110B or delivery hub 110C.

Additionally, the local area 100 includes undeliverable areas 122 that are not in the delivery areas 120 (i.e., are not contained within the delivery area boundaries 121) of any of the delivery hubs 110. Potential delivery locations within such undeliverable areas 122 are illustrated as undeliverable locations 114. Such undeliverable locations 114 do not receive deliveries of goods by the autonomous fleets dispatched from the delivery hubs 110. In various embodiments, alternative delivery methods may be utilized to provide delivery services to such undeliverable locations 114, such as traditional non-automated ground delivery methods. Although only a few delivery locations 112 and undeliverable locations 114 are illustrated, it should be understood that many more locations within the local area 100 may be delivery locations 112 or undeliverable locations 114 at various times, based upon user demand for deliveries to such other locations. For example, each illustrated delivery location 112 may represent an address associated with a customer order pending delivery, while numerous nearby addresses that could be delivery locations 112 have no orders currently pending delivery.

Figure 2:
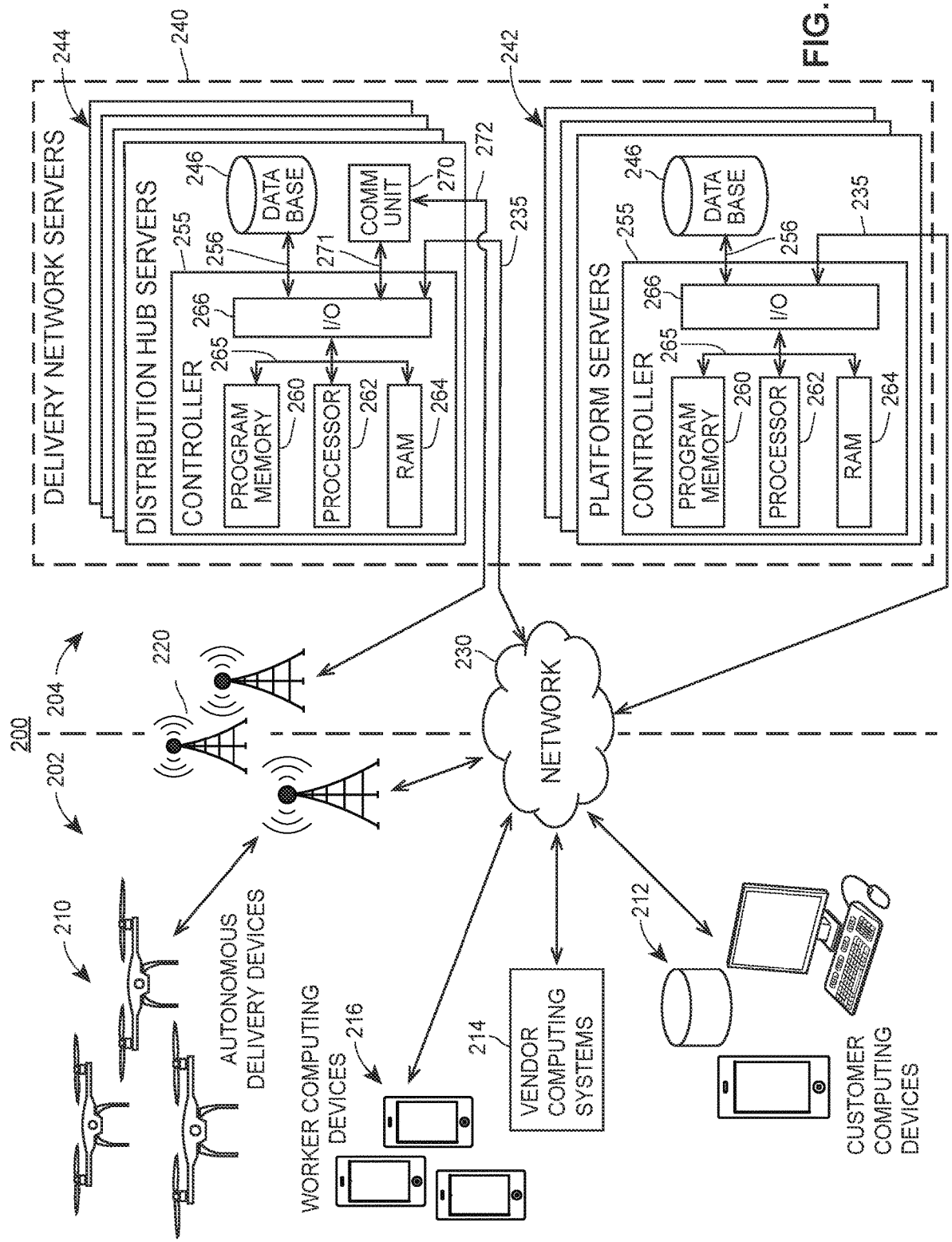
FIG. 2 illustrates a block diagram of an exemplary automated fleet delivery services system.

FIG. 2 illustrates a block diagram of an exemplary automated fleet delivery services system 200. The various components of the automated fleet delivery services system 200 are communicatively connected and operate to implement the methods described further herein. The high-level architecture may include both hardware and software applications, as well as various data communications channels for communicating data between the various hardware and software components. The automated fleet delivery services system 200 may be roughly divided into front-end components 202 and back-end components 204. The front-end components 202 may be associated with customers, vendors, or delivery fleets. The back-end components 204 may be associated with online commerce platforms, distribution systems, or delivery networks.

The front-end components 202 may include a plurality of computing devices configured to communicate with the back-end components 204 via a network 230. Various computing devices (including customer computing devices 212, vendor computing systems 214, or worker computing devices 216) of the front-end components 202 may communicate with the back-end components 204 via the network 230 to enable customers to order goods, vendors to receive and fill orders, or workers to dispatch or deliver orders. Each such computing device may include a processor and program memory storing instructions to enable the computing device to interact with the back-end components 204 via the network 230, which may include special-purpose software (e.g., custom applications) or general-purpose software (e.g., operating systems or web browser programs). The front-end components may further include autonomous delivery devices 210 of an automated delivery fleet, which are configured to deliver goods to customers at delivery locations 112. As illustrated, the autonomous delivery devices 210 may communicate with the back-end components 204 via a secure network 220 for added safety and security, such as a 5G telecommunications network or a proprietary wireless communication network.

The front-end components 202 may include a plurality of autonomous delivery devices 210 for delivering goods to customers. The autonomous delivery devices 210 are configured to receive instructions from the delivery network servers (e.g., the distribution hub servers 244) to pick up and delivery packages containing delivery contents to customers. The instructions may be received by the autonomous delivery devices 210 by wireless communication via the secure network 220, and the autonomous delivery devices 210 may also send current status data (e.g., location, operating status, local environmental conditions, weight of package, etc.) to the delivery network servers 240 via the secure network 220. The autonomous delivery devices 210 may obtain the delivery contents (e.g., may be loaded with goods to be delivered) at delivery hubs 110 and autonomously transport the delivery contents to customers at delivery locations 112. In some embodiments, the autonomous delivery devices 210 may include various aerial or terrestrial autonomous vehicles, such as UAVs or self-driving trucks. The autonomous delivery devices 210 may be capable of loading and unloading the delivery contents autonomously or may require human intervention to load and unload the delivery contents. For example, one or more workers associated with worker computing devices 216 may load packages into the autonomous delivery devices 210, and the customer may remove the packages by entering or scanning an access code. Alternatively, the autonomous delivery devices 210 may be configured to identify and secure packages left in loading zones, as well as to deposit such packages at the corresponding delivery locations 112 (e.g., by dropping the package at an entrance to a customer residence). In various embodiments, the autonomous delivery devices 210 may be individually associated with particular delivery hubs 110 serving corresponding delivery areas 120, or the autonomous delivery devices 210 may travel between delivery hubs 110 to obtain packages for delivery. In some embodiments, the autonomous delivery devices 210 may collect packages or delivery contents from a plurality of delivery hubs 110 before delivering the contents to the customer at a delivery location 112.

The back-end components 204 may comprise a plurality of delivery network server 240, which may in some embodiments be distributed across a plurality of sites. The delivery network servers 240 may collectively implement various aspects of the methods described herein for implementing online commerce order management, inventory management, and delivery management (including management of an automated delivery fleet). The delivery network servers 240 may include one or more platform servers 242 configured to manage the coordination of orders, inventory, and delivery. As illustrated, the platform servers 242 may communicate with the front-end components 202 via a link 235 to the network 230. The delivery network servers 240 may further include one or more distribution hub servers 244 configured to manage corresponding local fleets of autonomous delivery devices 210 for automated delivery services within corresponding delivery areas 120. In some embodiments, one distribution hub server 244 may manage delivery fleets for a plurality of delivery areas 120. Additionally, the distribution hub servers 244 may communicate with vendor computing systems 214 or worker computing devices 216 to manage inventory, order fulfilment, or manual delivery to undeliverable locations 114 (e.g., delivery by delivery workers associated with worker computing devices 216). As illustrated, the distribution hub servers 244 may communicate with the front-end components 202 via a link 235 to the network 230 or via a secure network link 272 to the secure network 220.

The back-end components 204 include one or more delivery network servers 240 configured to implement part or all of the processes described herein. The delivery network servers 240 may include platform servers 242 and distribution hub servers 244, as well as other servers (not shown), any of which is referred to herein as a delivery network server 240. Each delivery network server 240 may include one or more computer processors adapted and configured to execute various software applications and components of the automated fleet delivery services system 200, in addition to other software applications. The delivery network servers 240 may further include databases 246, which may be adapted to store data related to products, orders, customer accounts, vendor accounts, workers, delivery hubs, inventory, automated fleets, or other data used in facilitating electronic commerce and delivery. Each delivery network server 240 may have a controller 255 that is operatively connected to the database 246 via a link 256. It should be noted that, while not shown, additional databases may be linked to the controller 255 in a known manner. For example, separate databases may be used for various types of information, such as user profiles, current condition data, product data, fleet location data, or payment information. In some embodiments, external data sources (not shown) may be accessed via the network 230 to obtain generally available data, such geolocation data associated with street addresses or weather data.

The controller 255 may include a program memory 260, a processor 262 (which may be called a microcontroller or a microprocessor), a random-access memory (RAM) 264, and an input/output (I/O) circuit 266, all of which may be interconnected via an address/data bus 265. It should be appreciated that although only one processor 2262 is shown, the controller 255 may include multiple processors 262. Similarly, the memory of the controller 255 may include multiple RAMs 264 and multiple program memories 260. Although the I/O circuit 266 is shown as a single block, it should be appreciated that the I/O circuit 266 may include a number of different types of I/O circuits. The RAM 264 and program memories 260 may be implemented as semiconductor memories, magnetically readable memories, or optically readable memories, for example. The controller 255 may also be operatively connected to the network 230 via a link 235.

Some delivery network servers 240 may be communicatively connected to the secure network 220 via a communication unit 270 configured to establish, maintain, and communicate through the secure network 220. The communication unit 270 may be operatively connected to the I/O circuit 266 via a link 271 and may further be communicatively connected to the secure network 220 via a link 272. In some embodiments, some delivery network servers 240 may be communicatively connected to the secure network 220 through the network 230 via a link 235.

The delivery network servers 240 may further include a number of software applications stored in program memories 260. The various software applications stored on and executed by a delivery network server 240 may include one or more software applications for monitoring, predicting, facilitating, supporting, or optimizing fleet delivery activities (e.g., delivery trips by autonomous delivery devices 210). Such software applications may further include applications for providing information to users of front-end components 202, such as web server applications. In some embodiments, the software applications of some delivery network servers 240 may include machine learning applications for processing data according to supervised machine learning, unsupervised machine learning, or reinforcement machine learning techniques to develop models used by the delivery network servers 240, as described elsewhere herein. Additional or alternative software applications may be stored at and executed by controllers 255 of delivery network servers 240 in various embodiments.

The various computing devices (e.g., customer computing devices 212, vendor computing systems 214, or worker computing devices 216) of the front-end components 202 may communicate with the back-end components 204 via wired or wireless connections of the network 230. The network 230 may be a proprietary network, a secure public internet, a virtual private network or some other type of network, such as dedicated access lines, plain ordinary telephone lines, satellite links, cellular data networks, combinations of these. The network 230 may include one or more radio frequency communication links, such as wireless communication links with front-end components 202. The network 230 may also include other wired or wireless communication links with other computing devices or systems. Where the network 230 may include the Internet, and data communications may take place over the network 230 via an Internet communication protocol.

Additionally, the autonomous delivery devices 210 may communicate with the back-end components 204 (e.g., the distribution hub servers 244) via secure wireless connections of the secure network 220. In some embodiments, communication via the secure network 220 may be conducted using encrypted messages to provide data security. The secure network 220 may include a 5G new radio (5G NR) wireless telecommunications network or a portion thereof. In some embodiments, the secure network 220 may include both physical and software features that provide secure communications, including a virtual private network features to prevent interception or injection of communications by unauthorized devices. For example, the autonomous delivery devices 210 may communicate with the distribution hub servers 244 via a secure virtual private network over a public wireless telecommunications network. In further embodiments, the secure network 220 and the network 230 may be a single communication network or partially overlapping portions thereof.

The front-end components 202 and the back-end components 204 may implement various portions of the methods described herein and may communicate with other components to facilitate order processing, fulfilment, and delivery of goods as part of an electronic commerce system. Thus, the various front-end components 202 may communicate with the delivery network servers 240. The customer computing devices 212 may communicate with the platform servers 242 via the network 230 to select goods and place an order, to specify delivery options, or to track or confirm delivery. In some embodiments, the customer computing devices 212 may likewise communicate with the distribution hub servers 244 for information related to delivery or to the distribution hubs (e.g., for tracking delivery status or checking inventory at local distribution hubs). The customer computing devices 212 may communicate with the delivery network servers 240 via a customer interface that may include various application programming interfaces (APIs) of the delivery network to obtain data from and send data to the platform servers 242 or the distribution hub servers 244.

Similarly, the vendor computing systems 214 may communicate with the platform servers 242 or the distribution hub servers 244 via the network 230 to obtain order data and to provide inventory data. The vendor computing systems 214 may be configured to monitor and adjust inventory levels at a plurality of locations based upon the order data indicating orders placed for various products sold by the vendors. In some embodiments, the vendor computing systems 214 may receive requests from the delivery network servers 240 to restock products at delivery hubs 110 by sending shipments of products when inventor at such delivery hubs 110 reaches a threshold level. In further embodiments, the vendor computing systems 214 may direct redistribution of inventory between vendor locations or delivery hubs 110 based upon availability and demand. For example, vendor computing systems 214 may direct the distribution hub servers 244 to transfer inventory between locations using the autonomous delivery devices 210. In further embodiments, vendor computing systems 214 may be located at or near delivery hubs 110 and may be configured to receive instructions for loading goods into autonomous delivery devices 210 by vendor personnel for order fulfilment, which instructions may be provided by delivery network servers 240. In some such embodiments, the vendor computing systems 214 may communicate with the worker computing devices 216 (either directly or via the network 230) to instruct personnel to take actions relating to order fulfilment. The vendor computing systems 214 may communicate with the delivery network servers 240 via an inventory management interface that may include various APIs of the delivery network to obtain data from and send data to the platform servers 242 or the distribution hub servers 244.

Likewise, the worker computing devices 216 may communicate with the platform servers 242 or the distribution hub servers 244 via the network 230 to obtain order data and to provide order-related data. In some embodiments, the worker computing devices 216 may be associated with vendor personnel, workers at delivery hubs, or delivery workers. For example, the worker computing devices 216 may be mobile computing devices (e.g., smartphones or tablet computers) carried by delivery drivers to provide information regarding manual delivery of packages from the delivery hubs 110 or other distribution hub locations to undeliverable locations 114 within undeliverable areas 122. Thus, such delivery drivers may receive information regarding such deliveries that cannot be completed by the autonomous delivery devices 210 to enable the delivery drivers to make such deliveries. In some embodiments, the delivery drivers associated with the worker computing devices 216 may include gig-economy drivers providing on-demand delivery services. In further embodiments, the delivery drivers associated with the worker computing devices 216 may include employees associated with vendors or with delivery hubs 110. As another example, the worker computing devices 216 may be mobile computing devices associated with workers to provide information regarding unloading packages at delivery locations 112, retrieving or repairing malfunctioning autonomous delivery devices 210, or assisting customers with installation or configuration of delivered goods. As yet another example, the worker computing devices 216 may be mobile computing devices or workstation terminals used by workers in a warehouse or a delivery hub 110 to obtain information regarding orders in order to package goods for delivery or load packages for delivery by the autonomous delivery devices 210 of the automated delivery fleet. The worker computing devices 216 may communicate with the delivery network servers 240 via a worker interface that may include various APIs of the delivery network to obtain data from and send data to the platform servers 242 or the distribution hub servers 244.

Although the automated fleet delivery services system 200 is shown to include one or a limited number of the various front-end components 202 and of the back-end components 204, it should be understood that different numbers of any or each of these components may be utilized in various embodiments. Furthermore, the database storage or processing performed by one or more of the platform servers 242 or the distribution hub servers 244 may be distributed among a plurality of servers in an arrangement known as "cloud computing." This configuration may provide various advantages, such as enabling near real-time uploads and downloads of information, as well as providing additional computing resources needed to handle the monitoring, modeling, dispatching, and optimization tasks described herein. This may in turn support a thin-client embodiment of some computing devices of the front-end components 202.

Figure 3:
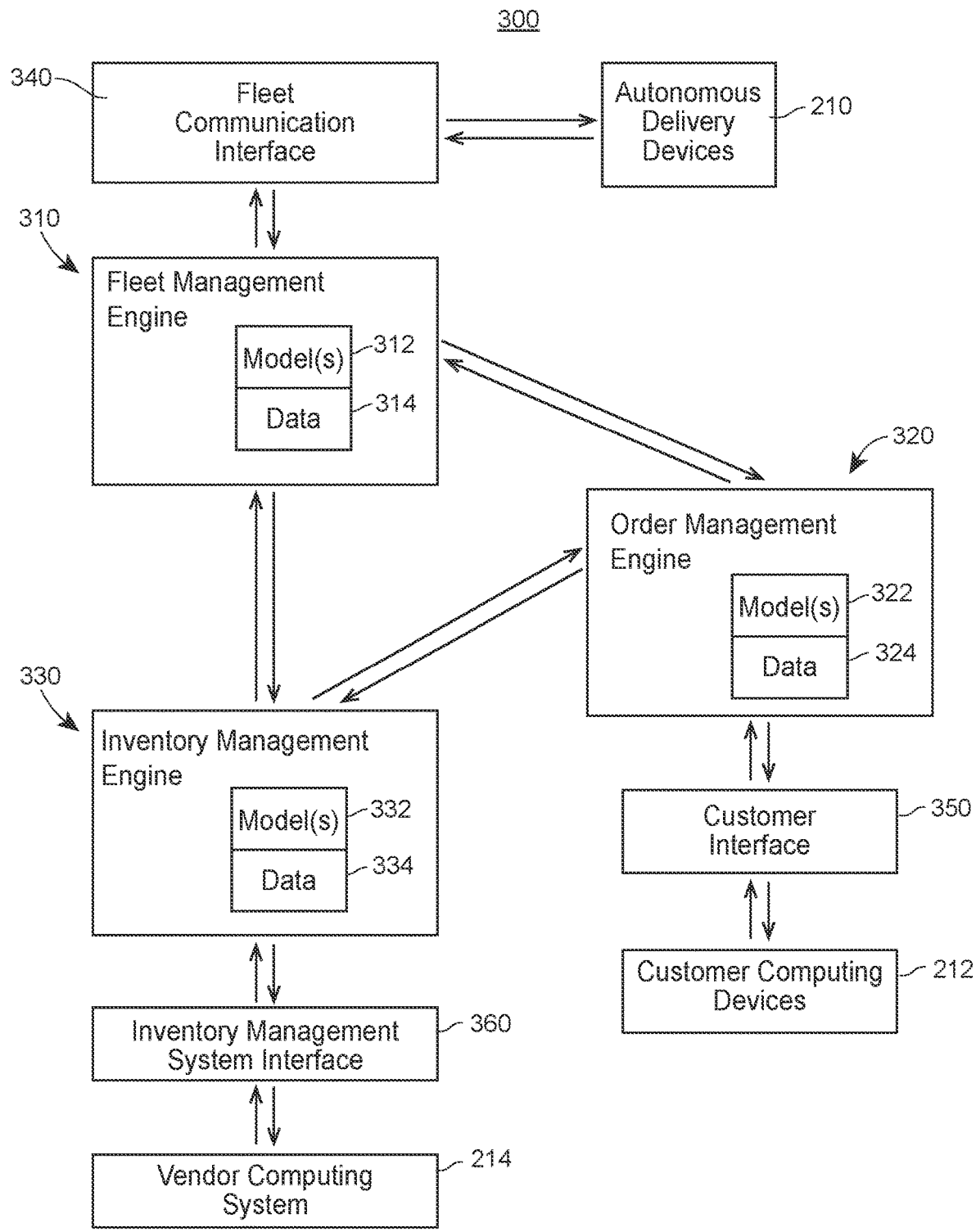
FIG. 3 illustrates a block diagram of an exemplary automated fleet delivery data network.

FIG. 3 illustrates a block diagram of an exemplary automated fleet delivery data network 300. As illustrated, the automated fleet delivery data network 300 includes three data management engines that are interconnected to manage aspects of order processing, inventory management, and package delivery. The data management engines include a fleet management engine 310 configured to monitor and control a fleet of autonomous delivery devices 210, an order management engine 320 configured to set prices and facilitate customer orders, and an inventory management engine 330 configured to monitor and manage inventory of products available for customers to purchase. Each of the data engines 310, 320, 330 is further configured to communicate with the other data engines and with other computing devices or systems (e.g., autonomous delivery devices 210, customer computing devices 212, or vendor computing systems 214) via a communication interface. The data engines 310, 320, 330 may be implemented as software instructions executed by one or more processors of the delivery network servers 240 using stored models and current data. Communication between the data engines 310, 320, 330 may include internal electronic communication between applications running on the delivery network servers 240 or external electronic communication between multiple delivery network servers 240 (e.g., communication between a platform server 242 and a distribution hub server 244). The automated fleet delivery data network 300 is exemplary only, and other configurations may include additional, fewer, or alternative aspects.

The fleet management engine 310 is configured to manage a fleet of autonomous delivery devices 210, such a UAVs. The fleet management engine 310 receives order data indicating orders placed by customers and inventory data indicating availability of products at various locations (e.g., delivery hubs 110 or other distribution hubs). In some embodiments, the fleet management engine 310 receives order data from the order management engine 320. Alternatively, the fleet management engine 310 may receive order data from an electronic commerce interface application (e.g., a customer interface 350) implemented by the delivery network server 240 or other servers communicatively connected thereto via the network 230. In further embodiments, the fleet management engine 310 receives inventory data from the inventory management engine 330. In some embodiments, one instance of the fleet management engine 310 may be implemented for each distribution hub (e.g., each delivery hub 110 or other distribution hub, such as a regional distribution hub) by executing computer-readable instructions on one or more distribution hub servers 244 located at or dedicated to such delivery hub 110 in order to manage an automated delivery fleet of autonomous delivery devices 210 assigned to the respective distribution hub.

The order data may include a plurality of orders associated with a plurality of delivery locations 112 and indicating products to be delivered to such delivery locations 112. In some embodiments, the order data may further include indications of priority of the orders, such that one or more orders may be indicated as higher priority for earlier delivery. The order data may be sent to the fleet management engine 310 as individual orders upon receipt of each order from a customer, or the order data may be aggregated and sent to the fleet management engine 310 as an ordered list of orders to be delivered. The inventory data may include indications of all products available at one or more distribution hubs (e.g., at a delivery hub 110 associated with the fleet management engine 310), or the inventory data may be limited to a subset of products. In some embodiments, the inventory data may comprise requests to move inventory between distribution hubs. Such requests may cause the fleet management engine 310 to redistribute excess inventory between delivery hubs 110, to restock a delivery hub 110 from a regional distribution hub that supplies a plurality of delivery hubs 110, or to restock a delivery hub 110 from a vendor location (e.g., a vendor store or warehouse).

The fleet management engine 310 may also send fleet data to the order management engine 320 or to the inventory management engine 330 to indicate fleet availability or usage levels. In some embodiments, the fleet data may include information indicating whether the automated delivery fleet associated with the fleet management engine 310 can complete a request from an order management engine 320 or inventory management engine 330 within prescribed limits (e.g., within a specified or predetermined time period). Thus, the fleet management engine 310 may provide fleet data in response to requests, such as a request for order fulfilment by delivering products to a delivery location 112 or a request for inventory distribution to one or more delivery hubs 110. In further embodiments, the fleet data may be sent to indicate current conditions of the automated delivery fleet that impact operation of the order management engine 320 or to the inventory management engine 330. For example, the fleet management engine 310 may send fleet data indicating reduced availability of autonomous delivery devices 210 for order delivery. Such fleet data indicating reduced availability may be sent when the number is below a threshold number of available autonomous delivery devices 210. As another example, the fleet data may indicate fleet availability on a recurring basis, such as periodically (e.g., every minute or every five minutes) or in response to conditions (e.g., when the number of available autonomous delivery devices 210 changes or when an order or request is received by the fleet management engine 310). In some embodiments, the fleet data may include predictions of future availability of autonomous delivery devices 210, which may be based upon predicted environmental conditions (e.g., high winds limiting UAV operation) or predicted completion of current activities (e.g., predicted return times of autonomous delivery devices 210 after completion of current deliveries).

To manage the fleet of autonomous delivery devices 210, the fleet management engine 310 may utilize one or more fleet management models 312 to analyze relevant fleet management data 314. The fleet management data 314 may include the current location, status, route, and payload of each of the plurality of autonomous delivery devices 210 of the fleet. The fleet management data may also include all current orders, as well as previously completed orders. In some embodiments, the fleet management data 314 may include data regarding other conditions impacting utilization or operation of the fleet, such as time of day or weather conditions. The fleet management models 312 may be trained according to machine learning techniques described below to optimize fleet deployment by generating distribution plans for assigning autonomous delivery devices 210 to deliver orders according to delivery plans or to distribute inventory according to inventory distribution plans. Such fleet management models 312 may assign fleet assets (i.e., autonomous delivery devices 210) to perform delivery or distribution tasks based upon localized demand and historical demand patterns. In some embodiments, such assignment may include transferring autonomous delivery devices 210 between delivery hubs 110. In further embodiments, such assignment may include assigning autonomous delivery devices 210 to inventory distribution or order delivery, or it may include delaying inventory distribution based upon predicted delivery demand. Since some delivery plans or inventory distribution plans may include multiple pick-up or drop-off locations along a route, the fleet management models 312 may further be applied to generate and assign routes to optimize fleet utilization.

Generating distribution plans for fleets of autonomous delivery devices 210 may include determining delivery plans, inventory distribution plans, or holding plans for each of the plurality of autonomous delivery devices 210 of the fleet. Holding plans may be used for autonomous delivery devices 210 not currently assigned to deliver orders or to distribute inventory (e.g., excess fleet capacity), such as by directing some autonomous delivery devices 210 to remain at a delivery hub 110 or to perform preparatory actions (e.g., by charging batteries or operating in a low-power mode to conserve energy in preparation for expected future delivery or inventory distribution activities). Distribution plans may be generated by applying the fleet management models 312 to the fleet management data 314, and such distribution models may be updated based upon changes in conditions (e.g., new orders, changes in environmental conditions, changes in fleet capacity, or changes in inventory levels). In some embodiments, the distribution plans may include contacting additional workers associated with worker computing devices 216 to delivery some orders, such as orders to be delivered to undeliverable locations 114 or excess orders at peak times when the automated delivery fleet is at or near capacity.

In some embodiments, the fleet management engine 310 may also monitor the status of the autonomous delivery devices 210 of the fleet in order to predict availability or to take preparatory or remedial measures. For example, the fleet management engine 310 may monitor autonomous delivery devices 210 to detect network intrusions or other security breaches, mechanical malfunctions, or battery depletion. In such instances, the fleet management engine 310 may recall any affected autonomous delivery devices 210 or take other responsive measures. For example, an autonomous delivery device 210 may be assigned to a holding plan to be recovered when unable to safely continue autonomous operation or directed to a recharging station when battery levels are low. In some embodiments, actions may be taken prior to problematic conditions based upon predictions of autonomous delivery devices 210 developing problematic conditions based upon observed current status. Thus, the fleet management engine 310 may preemptively address such problematic conditions at a time when the fleet is operating with excess capacity, thereby improving order delivery efficiency during times of peak demand.

The fleet management engine 310 may communicate with the plurality of autonomous delivery devices 210 of the automated delivery fleet via a fleet communication interface 340. The fleet communication interface 340 may be configured to establish and maintain secure connections via the secure network 220. In some embodiments, the fleet communication interface 340 may be further configured to monitor the location and operating status of each autonomous delivery device 210.

The order management engine 320 is configured to manage aspects of order pricing and processing for customer orders. The order management engine 320 receives fleet data indicating fleet capacity for order delivery from the fleet management engine 310 and inventory data indicating inventory levels for order fulfilment from the inventory management engine 330. The order management engine 320 may also send order data indicating customer orders to the fleet management engine 310 to facilitate order delivery and to the inventory management engine 330 to facilitate inventory tracking and distribution. In some embodiments, the order management engine 320 may be implemented by executing computer-readable instructions on one or more platform servers 242 to manage orders across a delivery network comprising many delivery areas 120. In further embodiments, the order management engine 320 may be implemented for each distribution hub (e.g., each delivery hub 110 or other distribution hub, such as a regional distribution hub) by executing computer-readable instructions on one or more distribution hub servers 244 located at or dedicated to such delivery hub 110 in order to manage orders based upon local conditions associated with a particular area. Such localization of the order management engine 320 may be used to account for local inventory limitations and delivery fleet capacity limitations in determining pricing or estimating delivery times for customer orders.

To manage aspects of customer orders, the order management engine 320 may communicate with a customer interface 350 configured to facilitate customer orders. The customer interface 350 may send and receive data between the order management engine 320 and the customer computing devices 212, as well as other data sources (e.g., databases 246). In some embodiments, the customer interface 350 may include an electronic catalog application, an online retail application, or similar components to provide information regarding available products to customers via the customer computing devices 212. For example, the customer interface 350 may obtain product data from a database 246 of products, as well as price data from the order management engine 320. The customer interface may also receive inventory data or availability data from the order management engine 320 (or directly from the inventory management engine 330). The customer interface 350 may thus collect and combine data regarding available products and present such data in a web page or mobile application format for communication to the customer computing devices 212. In some embodiments, the customer interface 350 may include or interface with a web server or application server to prepare and send information regarding products to customer computing devices 212.

The customer interface 350 may likewise receive customer order information from the customer computing devices 212 and sends relevant information relating to customer orders to the order management engine 320. In some embodiments, the customer interface 350 may manage payment processing or facilitate payment processing for the customer orders. Such payment information may not need to be sent to the order management engine 320, so the customer interface 350 may instead send only the relevant order data relating to fulfilment of the customer orders to the order management engine 320.

In some embodiments, the customer interface 350 may select one or more order management engines 320 to be associated with a customer order based upon a delivery location 112 associated with the order. For orders to be delivered to a delivery locations 112 within only one delivery area 120, the customer interface 350 may simply select an order management engine 320 corresponding to such delivery area 120. For orders to be delivered to delivery locations 112 in overlapping delivery areas 120, the customer interface 350 may select an order management engine 320 from between a plurality of order management engines 320 or may communicate with multiple order management engines 320 regarding the order, with the order management engine 320 being selected based upon order parameters generated by both order management engines 320 (e.g., the order management engine 320 having the lower price or the shortest predicted delivery time).

Similar to the fleet management engine 310, the order management engine 320 may utilize one or more order management models 322 to analyze relevant order management data 324. The order management data 324 may include current inventory levels, fleet availability, or order data regarding other orders by other customers. In some embodiments, the order management data 324 may include other currently placed orders and data regarding currently active shopping sessions of other customers in order to predict current delivery demand, which may include predicted demand by other customers currently shopping for products but whose orders have not yet been placed. In further embodiments, the order management data 324 may include other current orders and historical order data for use in predicting current delivery demand, which may include predicted orders in the near future. The order management models 322 may be trained according to machine learning techniques described below to determine or predict aspects of orders based upon the order management data 324. Such order management models 322 may be applied to the order management data 324 to predict a delivery time for an order prior to or after the order is placed. In some embodiments, the order management models 322 may generate separate predictions of delivery times based upon priority levels associated with the order, such as whether the customer places a high-priority order or a normal-priority order.

Additionally or alternatively, the order management models 322 may be applied to the order management data 324 to generate prices associated with orders, such as delivery charges. Such delivery charges may vary based upon the current demand for delivery services in a relevant delivery area 120 and current fleet availability of autonomous delivery devices 210. For example, delivery charges may be set at prices that encourage delayed delivery during peak demand times, while allowing lower prices during periods of lower demand for delivery services. In some embodiments, the order management models 322 may be applied to the order management data 324 to predict optimal times for delivery of an order based upon expected future demand for delivery services, predicted future fleet availability, and predicted future inventory availability. In some such embodiments, the order management engine 320 may provide one or more delivery time options (including associated prices) associated with an order to the customer interface 350 for presentation to a customer via a customer computing device 212. Thus, the customer may be enabled to select an option to defer delivery to a later time (e.g., later the same day or overnight) in exchange for a lower price. In still further embodiments, the order management models 322 may be applied to the order management data 324 to generate prices for various priority levels in order to balance current demand for delivery services with current and near-future fleet availability (e.g., by adjusting priority delivery charges to discourage priority delivery during peak demand times).

The inventory management engine 330 is configured to manage inventory levels at a plurality of distribution hubs (e.g., delivery hubs 110, regional hubs, or vendor facilities). The inventory management engine 330 applies inventory management models 332 to inventory management data 334 to determine optimal inventory distributions between the distribution hubs. In some embodiments, the optimal inventory distributions may comprise one or more inventory distribution plans for acquiring inventory from a vendor facility or redistributing inventory between distribution hubs (e.g., between delivery hubs 110), which inventory distribution plans may be implemented by sending corresponding inventory distribution requests to one or more fleet management engines 310 for performance by the autonomous delivery devices 210. Additionally or alternatively, inventory management engines 330 may send inventory data to the order management engines 320 to facilitate customer order management. In some embodiments, such inventory data may include current inventory levels or predicted inventory levels based upon historical inventory level patterns indicated by the inventory management models 332. In further embodiments, inventory management engines 330 may be configured to send alerts to order management engines 320 to indicate low inventory levels (e.g., notifications that fewer than a predetermined number of units of a product remain in inventory).

In some embodiments, the inventory management engine 330 may be implemented by executing computer-readable instructions on one or more platform servers 242 to manage inventory across a delivery network comprising multiple delivery areas 120. In some such embodiments, the inventory management engine 330 may manage inventory levels for a region or local area. In further embodiments, the inventory management engine 330 may be implemented for each of a plurality of distribution hubs (e.g., each delivery hub 110 or other distribution hub, such as a regional distribution hub) by executing computer-readable instructions on one or more distribution hub servers 244 located at or dedicated to such delivery hubs 110. In some such embodiments, an inventory management engine 330 may be implemented for each delivery area 120, and such area-specific inventory management engines 330 may be coordinated through a regional inventory management engine 330, which may be associated with a regional distribution hub.

The inventory management engine 330 may communicate with vendor computing systems 214 via an inventory management system interface 360. Such inventory management system interface 360 may enable the inventory management engine 330 to include vendor inventory within the inventory management data 334. In further embodiments, the inventory management engine 330 may send messages to vendors to obtain a supply of products from vendors, either by vendor delivery of such products to a distribution hub or by sending autonomous delivery devices 210 to vendor facility locations to retrieve additional products. The inventory management system interface 360 may be implemented by one or more delivery network servers 240 and communicate with the vendor computing systems 214 via the network 230, such as by providing APIs for integration of the vendor computing systems 214 or using APIs of the vendor computing systems 214.

To manage inventory levels, the inventory management engine 330 may utilize one or more inventory management models 332 to analyze relevant inventory management data 334. The inventory management data 334 may include current inventory levels at one or more delivery hubs 110, inventory levels at one or more other distribution hubs (e.g., regional distribution hubs), inventory availability from vendors (e.g., inventory levels obtained from vendor computing systems 214 or estimated delivery times for inventory orders from vendors based upon historical data), pending orders that will reduce inventory levels, pending inventory distribution plans that will adjust inventory levels, or previous inventory levels or changes in inventory levels. The inventory management models 332 may be trained according to machine learning techniques described below to predict inventory demand or generate inventory distribution plans to meet predicted inventory demand based upon the inventory management data 334. In some embodiments, the inventory management models 332 may be applied to the inventory management data 334 to predict inventory levels at one or more distribution hubs and related inventory demand at such distribution hubs. In further embodiments, the inventory management models 332 may generate inventory distribution plans based upon such predicted inventory levels or predicted inventory demand. Such inventory distribution plans may comprise requests to transfer inventory between distribution hubs. To avoid excessive inventory redistribution between distribution hubs, the inventory distribution plans may be generated for a limited number of distribution windows (e.g., three daily distribution windows). Predictions of inventory levels may be provided by the inventory management engine 330 to one or more order management engines 320. Inventory distribution plans or indications of insufficient predicted inventory levels relative to predicted inventory demand may be provided by the inventory management engine to one or more fleet management engines 310.

Figure 4:
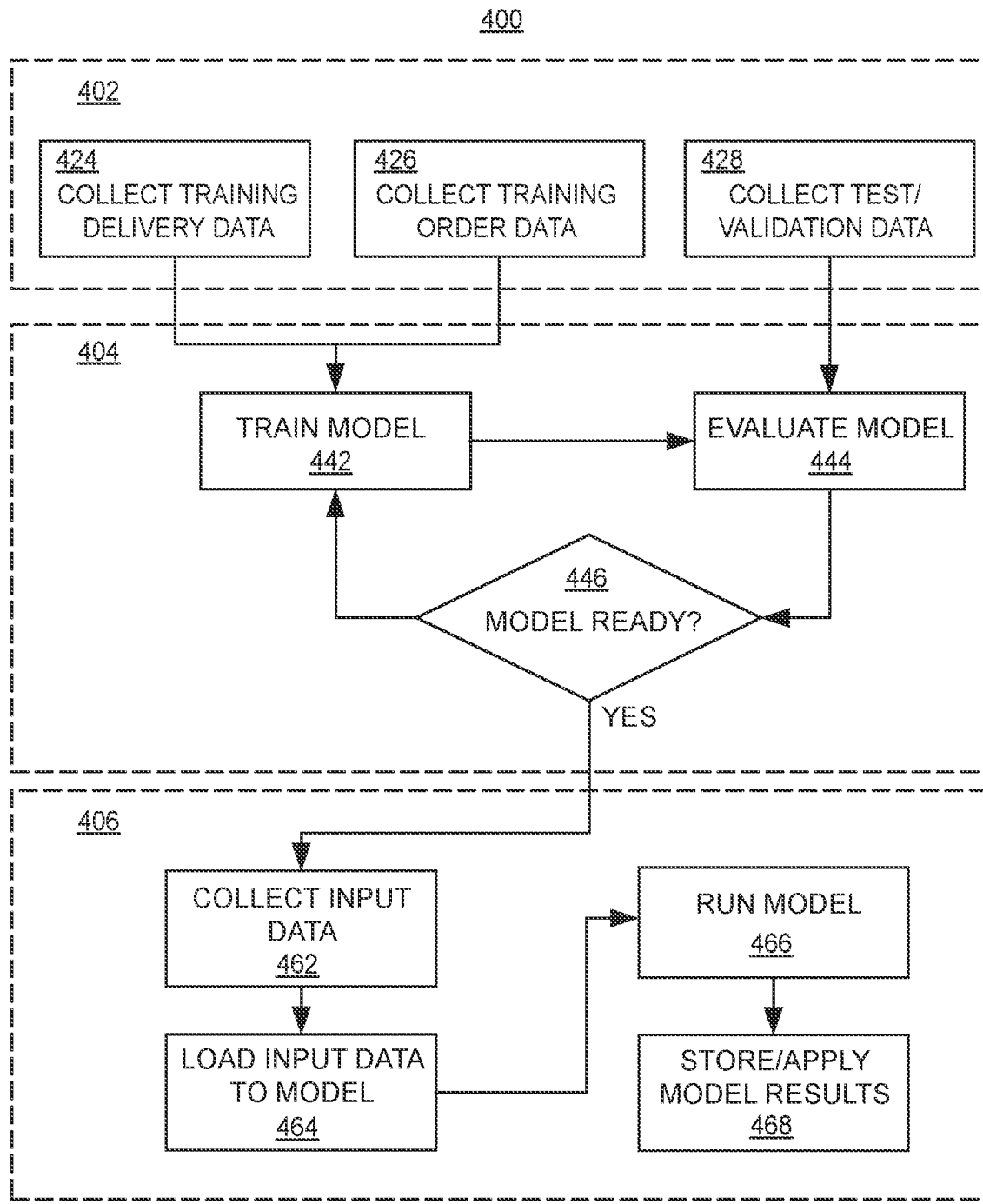
FIG. 4 illustrates a flow diagram of an exemplary machine learning modeling method.

FIG. 4 illustrates a block diagram of an exemplary machine learning modeling method 400 for training, evaluating and utilizing a Machine Learning (ML) model for determining optimal variable delivery fees and times options for each customer order based on the fulfilling hub, order details, and the current delivery data for that hub. The delivery fees are optimized in real time to either deter or incentivize new orders based on order demands and fleet capacity. Although predictive models may be generated by other techniques, the use of machine learning techniques is particularly useful in identifying and evaluating salient parameters using large datasets. In an embodiment, the model "learns" an algorithm capable of calculating or predicting the optimal delivery price to deter orders or incentivize new orders to match the corresponding order demand to fleet capacity, and eventually support much smaller delivery guarantee windows for standard orders and priority orders (e.g., rush orders). In some embodiments, the ML model may be trained to predict future orders and demand. At a high level, the machine learning modeling method 400 includes a block 402 for model design and preparation, a block 404 for model training and evaluation, and a block 406 for model deployment.

Depending on an embodiment, the ML model training, storage, and implementation may be performed at each or any of the plurality of the distribution hub servers 244, or the plurality of the platform servers 242. In some embodiments, the ML model training may be performed at one designated server (or designated group of servers), either a distribution server 244 or a platform server 242, and then shared between all the servers and stored on each individual server. In this embodiment, the ML model may be further trained at each server, to refine the predictions for each particular hub.

Depending on implementation, one or more ML models may be trained at the same time. Specific attributes in the training data sets may determine for which particular model each data set will be used. The said determination may be made on attributes such as order time and date, weather conditions, the number of available autonomous delivery devices 210 in the fleet, or distance of a delivery location 112 from a delivery hub 110. Training multiple models may provide an advantage of expediting calculations and further increasing specificity of prediction for each model's particular instance space.

Depending on implementation, the ML model may implement supervised learning, unsupervised learning, or semi-supervised learning. Such learning paradigms may include reinforcement learning. Supervised learning is a learning process for generalizing on problems where a prediction is required. A "teaching process" compares predictions by the model to known answers (labeled data) and makes corrections in the model. In such an embodiment, the order data may be labeled according to order details and the corresponding status of delivery data details (e.g., depending on the product inventory status, the amount of available delivery devices, the current load and details of queued deliveries, the distance of the order delivery address from the hub, etc.). Unsupervised learning is a learning process for generalizing the underlying structure or distribution in unlabeled data. In an embodiment utilizing unsupervised learning, the system may rely on unlabeled order data, unlabeled delivery data, or some combination thereof. During unsupervised learning, natural structures are identified and exploited for relating instances to each other. Semi-supervised learning can use a mixture of supervised and unsupervised techniques. This learning process discovers and learns the structure in the input variables, where typically some of the input data is labeled, and most is unlabeled. The training operations discussed herein may rely on any one or more of supervised, unsupervised, or semi-supervised learning with regard to the order data and delivery data, depending on the embodiment.

The block 402 may include any one or more blocks or sub-blocks 424-428, which may be implemented in any suitable order. At the block 424, the ML model training module, executed by processor 262 according to instructions on program memory 260, may obtain from database 246 one or more data sets of delivery data regarding deliveries of customer orders and associated then-current conditions. Similarly, at block 426, the ML model training module may obtain from database 246 one or more data sets of order data regarding customer orders and associated then-current conditions. Thus, the training data sets may include a delivery data set, indicative of one or more delivery patterns for training the selected model, and an order data set, indicative of one or more order detail patterns for training the selected model.

In some embodiments, the one or more sets of the order data may be acquired from any suitable devices providing order details, order product details, and customer profile details, such as customer computing devices 212, vendor computing systems 214, or delivery network servers 240. In some embodiments, the order data sets may contain order time and date, ordered product name and inventory number, product inventory status at time of order, customer subscription status (e.g., priority subscriber or regular), order type (e.g., priority/rush or standard), customer previous order history, and customer address (or geolocation, such as global positioning system (GPS) coordinates).

In some embodiments, the one or more sets of the delivery training data may be collected from any suitable devices providing delivery and fleet availability and capacity details associated with each order at the associated order hub, such as automated delivery devices 210, via the secure network 220, and/or delivery network servers 240. In some embodiments, the delivery data sets may contain the number of dispatched and the number of available autonomous delivery devices 210 of the fleet, total number of queued deliveries, number of queued priority deliveries, location of dispatched fleet devices, expected turnaround of the dispatched fleet devices, weather conditions, and data on airspace or roads congestion.

In some embodiments, the order and the delivery training data sets may include data indicative of order demands and fleet capacity for areas other than the areas associated with the hubs for which the ML model or models are being trained in addition to or instead of data indicative of order demands and fleet capacity for the areas associated with the hubs for which the ML model or models are being trained.

At the block 428, the ML module receives test data for testing the model or validation data for validating the model (e.g., from one of the described respective data sources). Some or all of the training, test, or validation data sets may be labeled with pre-determined delivery price and time combinations. The developed model may utilize this scale to rank the target features of the model, and in some implementations determine one or more optimal delivery price and time combinations.

The ML model development and evaluation module of the block 404, which takes place in the ML model training module, executed by processor 262 according to instructions on program memory 260, may include any one or more blocks or sub-blocks 442-446, which may be implemented in any suitable order. In a typical example, at block 442, the training module trains the ML model by running the one or more training data sets described above. At block 444, the ML training module evaluates the ML model, and at block 446, the ML training module determines whether or not the ML model is ready for deployment before either proceeding to block 406 or returning to block 442 to further develop, test, or validate the model.

Regarding the sub-block 442 of the block 404, developing the model typically involves training the model using training data. At a high level, machine-learning models are often utilized to discover relationships between various observable features (e.g., between predictor features and target features) in a training dataset, which can then be applied to an input dataset to predict unknown values for one or more of these features given the known values for the remaining features. These relationships are discovered by feeding the model training data including instances each having one or more predictor feature values and one or more target feature values. The model then "learns" an algorithm capable of calculating or predicting the target feature values (e.g., optimal delivery price to deter orders or incentivize new orders to match the order demand to fleet capacity) given the predictor feature values (e.g., orders demand, inventory status, and delivery fleet capacity).

Regarding the sub-block 444 of the block 404, evaluating the model typically involves testing the model using testing data or validating the model using validation data. Testing/validation data typically includes both predictor feature values and target feature values (e.g., including order demand patterns for which corresponding delivery patterns are known), enabling comparison of target feature values predicted by the model to the actual target feature values, enabling one to evaluate the performance of the model. This testing/validation process is valuable because the model, when implemented, will generate target feature values for future input data that may not be easily checked or validated. Thus, it is advantageous to check one or more accuracy metrics of the model on data for which you already know the target answer (e.g., testing data or validation data), and use this assessment as a proxy for predictive accuracy on future data. Example accuracy metrics include key performance indicators, comparisons between historical trends and predictions of results, cross-validation with subject matter experts, comparisons between predicted results and actual results, etc.

Regarding the sub-block 446 of the block 404, the processor unit 262 may utilize any suitable set of metrics to determine whether or not to proceed to the block 406 for model deployment. Generally speaking, the decision to proceed to the block 406 or to return to the block 442 will depend on one or more accuracy metrics generated during evaluation (the block 444). After the sub-blocks 442-446 of the block 404 have been completed, the processor unit 262 may implement the block 406.

The block 406 may include any one or more blocks or sub-blocks 462-468, which may be implemented in any suitable order. In a typical example, the processor unit 262 collects input data (block 462), loads the input data into the model module (block 464), runs the model with the input data (block 466), and stores results generated from running the model on the memory 260 or applies the results from running to model to manage aspects of the fleet management, order management, or fleet management (block 468).

Note, the machine learning modeling method 400 may be implemented in any desired order and may be at least partially iterative. That is, the block 402 may be implemented after the block 404 or after the block 406 (e.g., to collect new data for training, testing, or validation), and the block 404 may be implemented after the block 406 (e.g., to further improve the model via training or other development after deployment).

Figure 5:
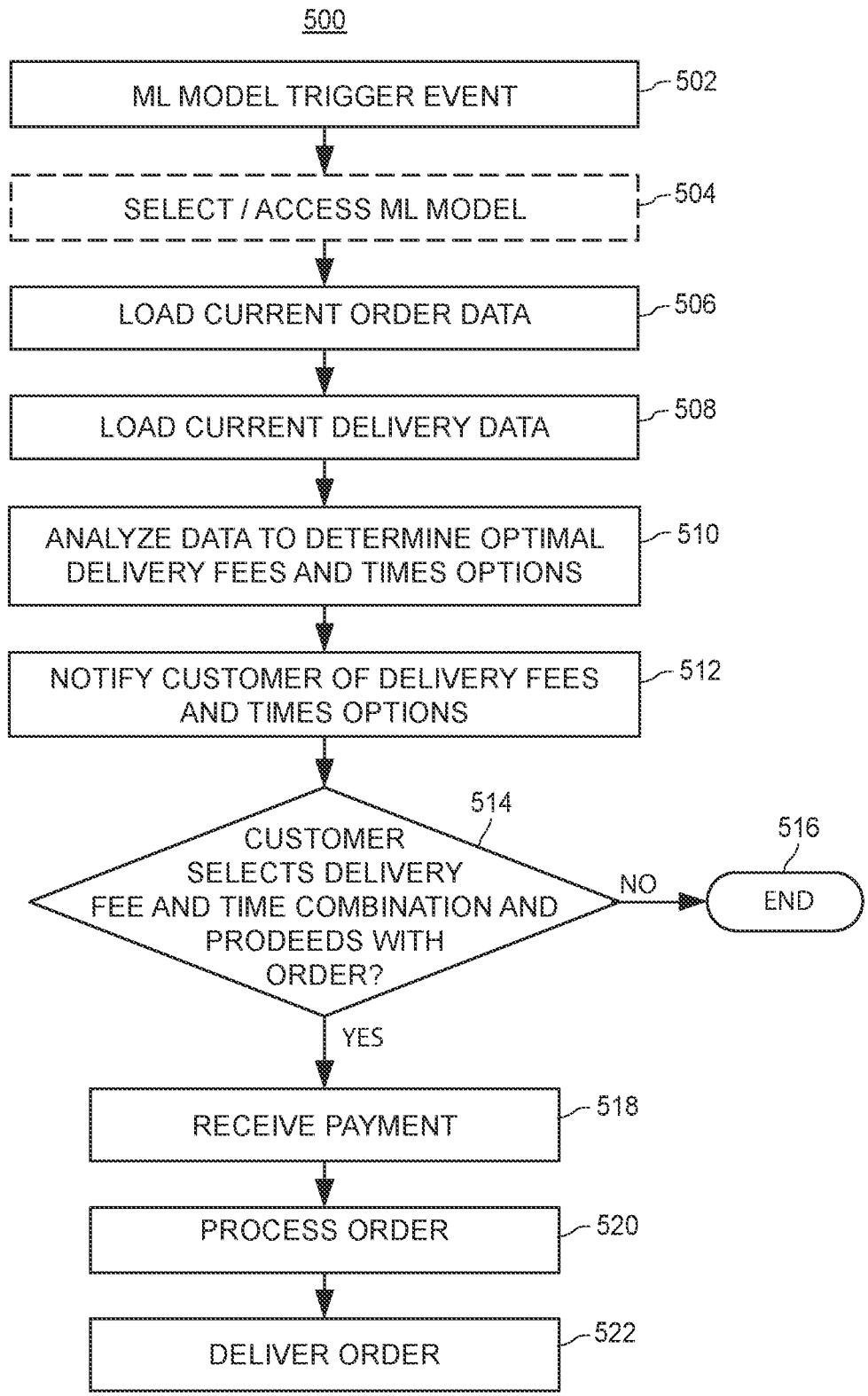
FIG. 5 illustrates a flow diagram of an exemplary order management method.

FIG. 5 illustrates a flow diagram for an exemplary order management method 500 for implementing a ML model to: (i) assess optimal variable delivery fees and times options based on analyzed current order data and current delivery data; (ii) notify a customer of the determined delivery fees and times options; and, based on the customer selection, either (iii) process and deliver order, or (iv) end the operation.

The order management method 500 may begin with a ML model trigger event (block 502). At block 504, an appropriate ML model may be selected, and current order data and current delivery data may be loaded into the selected model at blocks 506 and 508, respectively. Block 504 may or may not be implemented, depending on the embodiment, to select an appropriate ML model based upon general conditions (e.g., time of day and day of week). The loaded data sets may be analyzed to determine optimal delivery fees and times options (block 510), which may be communicated to the customer (block 512). At block 514, the customer either selects one of the presented delivery fee and time combinations and proceeds with the order, or aborts the process (block 516). If the customer chooses to proceed with the order, at block 518 payment is received, then the order is processed at block 520, and the order is delivered at block 522. In some embodiments, some subscription customers may obtain pricing without variable delivery fees, based on the level of their subscription (e.g., priority subscribers may be charged a low baseline fee or no fee for delivery). In those scenarios, blocks 502 through 514 would not apply for such customers, their order placing process would initiate at block 518.

At block 502, the system receives a ML model trigger event. The trigger event may be the customer selecting a product or products on a customer computing device 212 communicatively connected via the network 230 to one of the platform servers 242 interfaced with a vendor website, or may be the customer proceeding to the check-out web page on the vendor website, or any other suitable event.

At block 504, in some embodiments, an appropriate ML model may be selected based on specific attributes of the trigger event 502. The selection may be based on attributes such as order time and date, customer subscription status (e.g., priority subscriber or regular), weather conditions, or delivery address distance from a hub. In an embodiment where only one ML model was trained, this block may not need to be implemented.

At block 506, the current order data is loaded into the selected ML model. In some embodiments, the current order data may be acquired from any suitable devices providing order details, order product details, and customer profile details, such as customer computing devices 212, vendor computing systems 214, and/or delivery network servers 240. In some embodiments, the order data sets may contain order time and date, ordered product name and inventory number, product inventory status at time of order, customer subscription status (e.g., priority subscriber or regular), order type (e.g., priority/rush or standard), customer previous order history, and customer address.

At block 508, the current delivery data is loaded into the selected ML model. In some embodiments, the one or more sets of the delivery data may be obtained from any suitable devices providing delivery and fleet availability and capacity details associated with each order at the associated order hub, such as automated delivery devices 210, via the secure network 220, and/or delivery network servers 240. In some embodiments, the delivery data sets may contain the number of dispatched and the number of available fleet, location of dispatched fleet, total number of queued deliveries, number of queued priority deliveries, expected turnaround of the dispatched fleet, weather conditions, and data on airspace or roads congestion.

At block 510, the current order and deliver data are analyzed by the ML model to determine the optimal delivery fees and times options with the intention to either deter new orders at times of high demand for either a specific product (or overall delivery demand at a specific hub associated with the specific customer) or to incentivize new orders at times of low demand for a specific product (or low demand for orders overall at a specific hub associated with the specific customer). In an embodiment, at times of high demand, the adjusted delivery fee may be determined as a percentage increase dependent on a corresponding decrease in one or a combination of factors, such as inventory and delivery capacity. For example, a certain decrease in the inventory (e.g., below 10 units, or below 5 units, etc.) correlates to a certain score increase in delivery fee (e.g., a 5, 10, or 15 percent delivery fee increase, or a linear or a non-linear monetary unit amount increase, etc.). Further, a certain decrease in fleet availability (e.g., a percentage decrease from 100 to 0 percent), and in fleet capacity may be combined with inventory status to generate a composite score (linear, or non-linear), that determines the optimal delivery fee increase to guarantee delivery within a certain standard delivery time window (e.g., 30 minutes, 1 hour, 1.5 hours, or 2 hours, etc.). Additionally, in some embodiments, in situations of high demand, at block 510, the order management method 500 may determine an alternative delivery time surpassing the standard delivery time window, a time that can guarantee a standard delivery fee, or no additional delivery fee (if the standard delivery fee is calculated into the product price). Additionally, in some embodiments, in situations of high demand, at block 510, the order management method 500 may determine a monetary incentive (e.g., a certain percentage discount) for delaying product delivery by a certain amount of time (e.g., a linear, or a non-linear percentage discount increase per each hour of delivery delay).

At block 512, a server 240 may notify the customer of the determined optimal delivery fees and times options (e.g., via communication through the network 230 with a customer computing device 212). At different order and delivery demands scenarios, the customer may be presented with different types and variations of delivery fees and times options. In an embodiment, in a scenario of regular demand and delivery capacity, the customer may be presented with either a regular delivery fee, or no delivery fee, if a delivery fee is incorporated in the product price. In an embodiment, in a scenario of high product demand and limited delivery capacity, the customer may be presented with a delivery fee surcharge to guarantee delivery within a certain time window, or a combination of different delivery fees and delivery times options, where the delivery fees decrease with increasing delivery times. In an embodiment, the customer may be presented with a discount or discounts for current or future product orders or deliveries, future deliveries, or future priority deliveries, etc., if the customer chooses a later delivery time. In an embodiment, in a scenario of low product demand and high delivery capacity, the customer may be presented with a discount or discounts for current product orders or deliveries, or a discount on priority delivery options, etc.

At block 514, in an embodiment, the customer either selects one of the available delivery fee and delivery time option and proceeds with the order, or aborts placing the order. If a customer selects a certain delivery fee and time combination, the customer may be directed to block 518, where one of the servers 240 requests and receives payment from the customer for the selected product or products. At block 520, the order may be processed by a server 240, and at block 522 the delivery may be coordinated by one of the delivery network servers 240, and completed by one of the autonomous delivery devices 210 of an automated delivery fleet, as discussed elsewhere herein.

Figure 6:
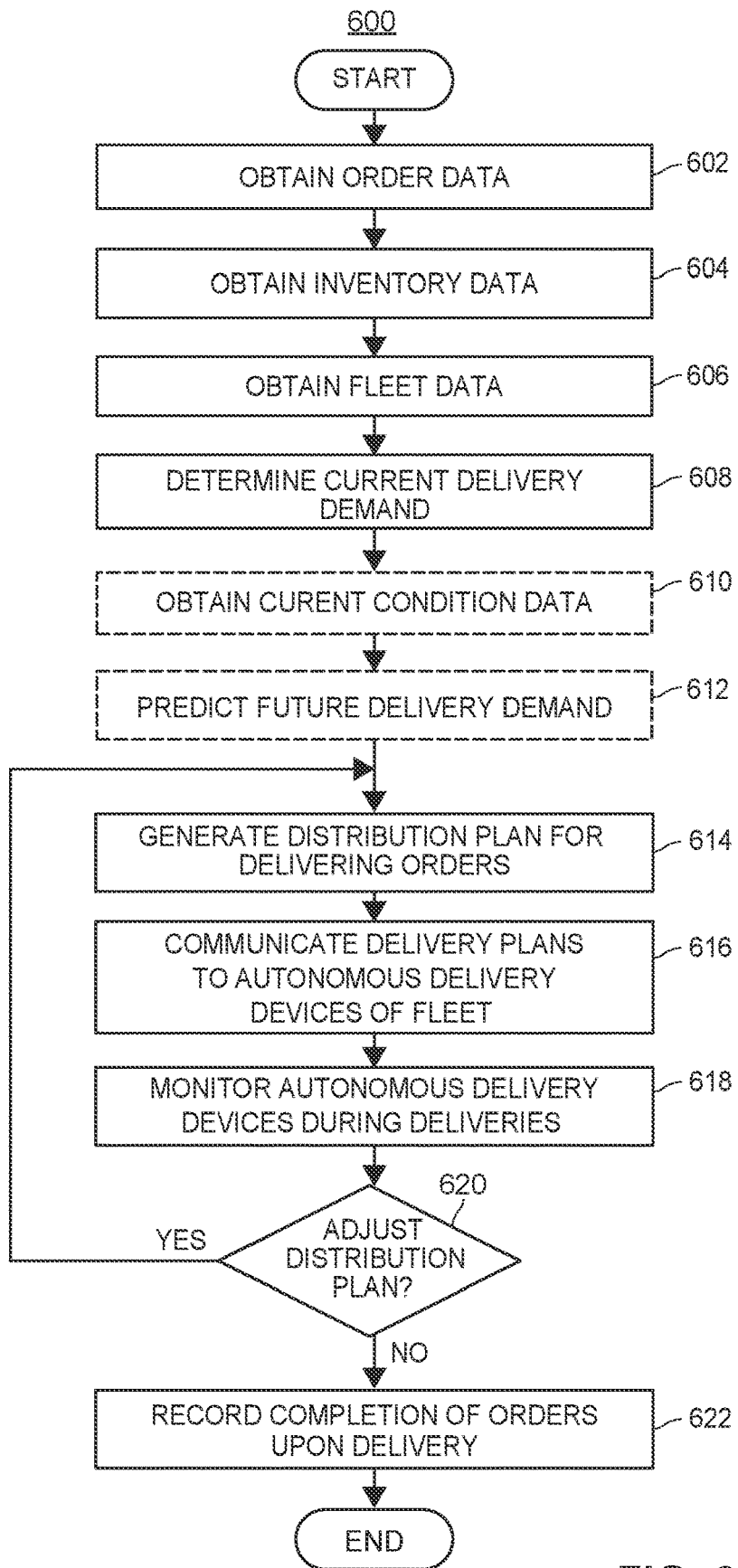
FIG. 6 illustrates a flow diagram of an exemplary fleet management method to generate distribution plans for delivering customer orders.

FIG. 6 illustrates a flow diagram of an exemplary fleet management method 600 to generate distribution plans for delivering customer orders to a plurality of delivery locations 112 within a delivery area 120 associated with a delivery hub 110. The fleet management method 600 is exemplary only, and other methods may include additional, fewer, or alternative actions. The fleet management method 600 may be performed by the fleet management engine 310 running on a distribution hub server 244.

The fleet management method 600 begins by obtaining order data indicative of a plurality of customer orders (block 602), obtaining inventory data indicative of inventory levels at one or more delivery hubs 110 (block 604), and obtaining fleet data indicative of the current locations and statuses of autonomous delivery devices 210 of an automated delivery fleet (block 606). Based upon such data, a current delivery demand level or profile may be determined (block 608). In some embodiments, current condition data may also be obtained (block 610) in order to account for conditions in the operating environment of the fleet. In further embodiments, a prediction of delivery demand for a relevant future period may be generated (block 612) in order to account for both current and expected near-term future demand for deliveries. Based upon such information, a distribution plan for delivering the customer orders is generated (block 614) and corresponding delivery plans are communicated to the autonomous delivery devices 210 of the fleet (block 616) to instruct them to make the deliveries. The deliveries of the customer orders by the fleet are then monitored (block 618) and, if an adjustment to the distribution plan is needed (block 620), a new distribution plan is generated (block 614). Once the orders have been delivered, the completion of the orders is recorded (block 622).

At block 602, the fleet management engine 310 may obtain order data regarding a plurality of customer orders. Such order data may be obtained in a batch (e.g., periodically in batches of orders) or may be obtained on a continuous basis as new orders are placed by customers and assigned to the fleet management engine 310 by the order management engine 320. Thus, the fleet management engine 310 may obtain order data for a plurality of pending orders over an interval of time as such plurality of orders are placed. The order data may be obtained from or stored within the fleet management data 314.

At block 604, the fleet management engine 310 may similarly obtain inventory data indicative of inventory levels of relevant products for fulfilling the orders. In some embodiments, the fleet management engine 310 may obtain inventory data indicative of all available inventory for a relevant delivery area 120 (e.g., inventory levels for all products at a corresponding delivery hub 110). In other embodiments, the fleet management engine 310 may obtain inventory data for only products to be delivered as part of the plurality of orders. The fleet management engine 310 may obtain the inventory data from an inventory management engine 330. In further embodiments, the fleet management engine 310 may obtain the inventory data from an inventory database maintained for a corresponding delivery area 120. The inventory data may be obtained from or stored within the fleet management data 314.

At block 606, the fleet management engine 310 may similarly obtain fleet data regarding the automated delivery fleet of autonomous delivery devices 210 associated with the fleet management engine 310. Such fleet data may include locations, routes, plans, or statuses of autonomous delivery devices 210 of the automated delivery fleet. In some embodiments, such automated delivery fleet may comprise a plurality of autonomous delivery devices 210 associated with a particular delivery area 120 or a particular delivery hub 110 associated with the fleet management engine 310. The fleet data may be obtained from or stored within the fleet management data 314.

At block 608, the fleet management engine 310 may determine current delivery demand to be managed (e.g., deliveries to be made by the automated delivery fleet). In some embodiments, determining current delivery demand may include determining a delivery demand profile indicating numbers of deliveries within certain delivery areas 120 (or sub-areas within a delivery area 120), numbers of deliveries to be completed within time windows (e.g., ten minute incremental windows), numbers of priority orders, or other divisions of the order data. In further embodiments, the current delivery demand may be determined relative to current fleet usage or capacity.

At block 610, in some embodiments, the fleet management engine 310 may obtain current condition data regarding conditions relevant to order delivery or to future delivery demand (e.g., weather data, traffic data, time of day, or day of week). In some such embodiments, current condition data may be obtained via the network 230 from other data sources, such as weather data systems or navigation systems providing traffic data.

At block 612, in some embodiments, the fleet management engine 310 may predict future delivery demand for a relevant time period. The future delivery demand may be estimated using one or more fleet management models 312 based upon patterns of previous demand. For example, future delivery demand may be predicted for one or two hours to allow the fleet management engine 310 to prepare for such demand (e.g., by recharging batteries of autonomous delivery devices 210 in advance of an anticipated peak demand time period).

At block 614, the fleet management engine 310 may generate a distribution plan for delivering the plurality of orders by analyzing the fleet management data 314 by one or more fleet management models 312. In some embodiments, this may include selecting a fleet management model 312 based upon the obtained data (e.g., order data, inventory data, fleet data, or condition data). Such distribution plan may include delivery plans for each of the plurality of orders by the autonomous delivery devices 210. Some such delivery plans may include multiple stops for deliveries at a plurality of delivery locations 112 or for loading packages to be delivered from a plurality of delivery hubs 110. In some embodiments, such distribution plan may also include holding plans for autonomous delivery devices 210, such as holding plans for autonomous delivery devices 210 presently needed for deliveries. In further embodiments, such distribution plan may include an inventory distribution plan or inventory distribution plans for replenishing or redistributing inventory at one or more delivery hubs 110.

At block 616, the fleet management engine 310 may communicate one or more delivery plans to one or more autonomous delivery devices 210 of the automated delivery fleet. Such communication may include sending routes, flight plans, or target coordinates to autonomous delivery devices 210 via the secure network 220.

At block 618, the fleet management engine 310 may monitor operation of the autonomous delivery devices 210 in carrying out the distribution plan. Thus, the fleet management engine 310 may obtain location and status data from the autonomous delivery devices 210 via the secure network 220. Such data may be stored in the fleet management data 314.

At block 620, the fleet management engine 310 may determine whether to adjust the distribution plan based upon the data obtained by monitoring the autonomous delivery devices 210. For example, mechanical problems in autonomous delivery devices 210 or inventory shortages may require adjustment to the distribution plan. Likewise, in some embodiments, changed conditions (e.g., changing weather conditions, new order, or order cancellations) may require adjustments to the distribution plan. When the fleet management engine 310 determines to adjust the distribution plan, the fleet management engine 310 may generate a new or updated distribution plan (block 614), communicate such distribution plan to the automated delivery fleet (block 616), and monitor progress of such distribution plan (block 618). When no adjustment to the distribution plan is determined to be needed, the fleet management method 600 may continue.

At block 622, the fleet management engine 310 may record completion or fulfilment of the customer orders upon delivery of the corresponding products or packages by the autonomous delivery devices 210.

Figure 7:
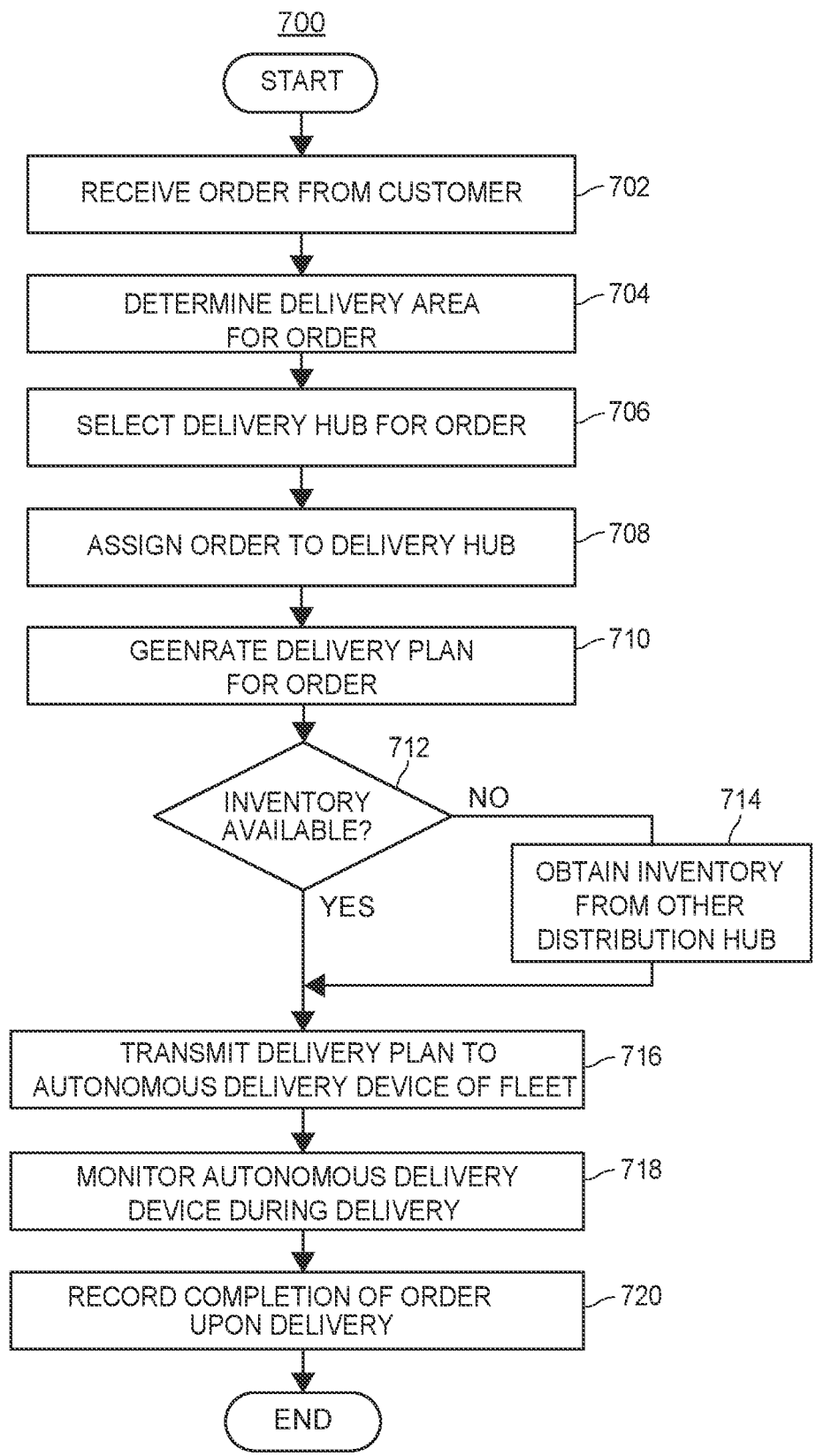
FIG. 7 illustrates a flow diagram of an exemplary order delivery method for managing delivery of a customer order to a delivery location.

FIG. 7 illustrates a flow diagram of an exemplary order delivery method 700 for managing delivery of a customer order to a delivery location 112 by an autonomous delivery device 210 of an automated delivery fleet. The order delivery method 700 is exemplary only, and other methods may include additional, fewer, or alternative actions. Parts of the order delivery method 700 may be performed by the order management engine 320, the fleet management engine 310, or the inventory management engine 330, each of which may be running on a distribution hub server 244 or a platform server 242.

The order delivery method 700 begins with receiving an order from a customer (block 702). Based upon the delivery location 112 associated with the order, a corresponding delivery area 120 for the order is determined (block 704), and a corresponding delivery hub 110 for the order is selected (block 706). The order is then assigned to the delivery hub 110 (block 708), and the delivery hub 110 generates a delivery plan for the order (block 710). If insufficient inventory is determined to be available to fulfil the order (block 712), additional inventory is obtained from one or more other distribution hubs (block 714). When the necessary inventory is available, the delivery plan is sent to one or more autonomous delivery devices 210 of the fleet (block 716) to instruct them to deliver the ordered products to the delivery location 112. Operation of the one or more autonomous delivery devices 210 is monitored during delivery (block 718), and the order is recorded as complete when the order has been delivered (block 720).

At block 702, the order management engine 320 may receive an order from a customer via a customer interface 350 providing an interface with a customer computing device 212. The order data associated with the order may include an indication of products to be delivered as part of the order, as well as a delivery location 112 for the ordered products to be delivered. In some embodiments, the order data may include a priority of the order, a delivery charge associated with the order, or a time window for delivery.

At block 704, the order management engine 320 may determine a delivery area 120 for the order based upon the order data. For example, the delivery area 120 may be determined by identifying the delivery area 120 containing the delivery location 112. If the delivery location 112 is not within a delivery area 120, the order management engine 320 may determine the order should be manually delivered. If the delivery location 112 is within overlapping delivery areas 120, the order management engine 320 may identify one or more such delivery areas 120 for the delivery.

At block 706, the order management engine 320 may select a delivery hub 110 to fulfil the order. In some embodiments, this may include selecting the delivery hub 110 associated with the delivery area 120 determined for the order. In further embodiments, this may include selecting one or more of the delivery hubs 110 associated with the one or more delivery areas 120 determined for the order. In some such embodiments, the order management engine 320 may obtain fleet availability or capacity data for each candidate delivery hub 110. Additionally or alternatively, the order management engine 320 may obtain inventory data for each candidate delivery hub 110. One or more delivery hubs 110 may thus be selected based upon their ability to fulfil the order in a timely manner. In some embodiments, parts of the order may be assigned to different delivery hubs 110.

At block 708, the order management engine 320 may assign the order to the selected one or more delivery hubs 110. Assigning the order to a delivery hub 110 may include sending an indication of the order to a fleet management engine 310 associated with such delivery hub 110 for delivery.

At block 710, the fleet management engine 310 associated with the assigned delivery hub 110 for the order may generate a delivery plan for the order. The delivery plan may be generated as part of a broader distribution plan, as described elsewhere herein.

At block 712, the fleet management engine 310 may determine whether there is sufficient inventory available to fulfil the order from the assigned delivery hub 110. When there is not sufficient inventory at the delivery hub 110, the fleet management engine 310 may cause at block 714 one or more autonomous delivery devices 110 to obtain the needed inventory from another distribution hub (e.g., another delivery hub 110 or a regional distribution hub). The delivery may then proceed.

At block 716, the fleet management engine 310 may communicate the delivery plan to an autonomous delivery device 210 to direct delivery of the order to the delivery location 112. At block 718, the fleet management engine 310 may then monitor operation of the autonomous delivery device 310 during delivery. At block 720, the fleet management engine 310 may record the order as complete upon delivery. In some embodiments, the fleet management engine 310 may send an indication of delivery to the order management engine 320, in response to which the order management engine 320 may record the order as complete.

Figure 8:
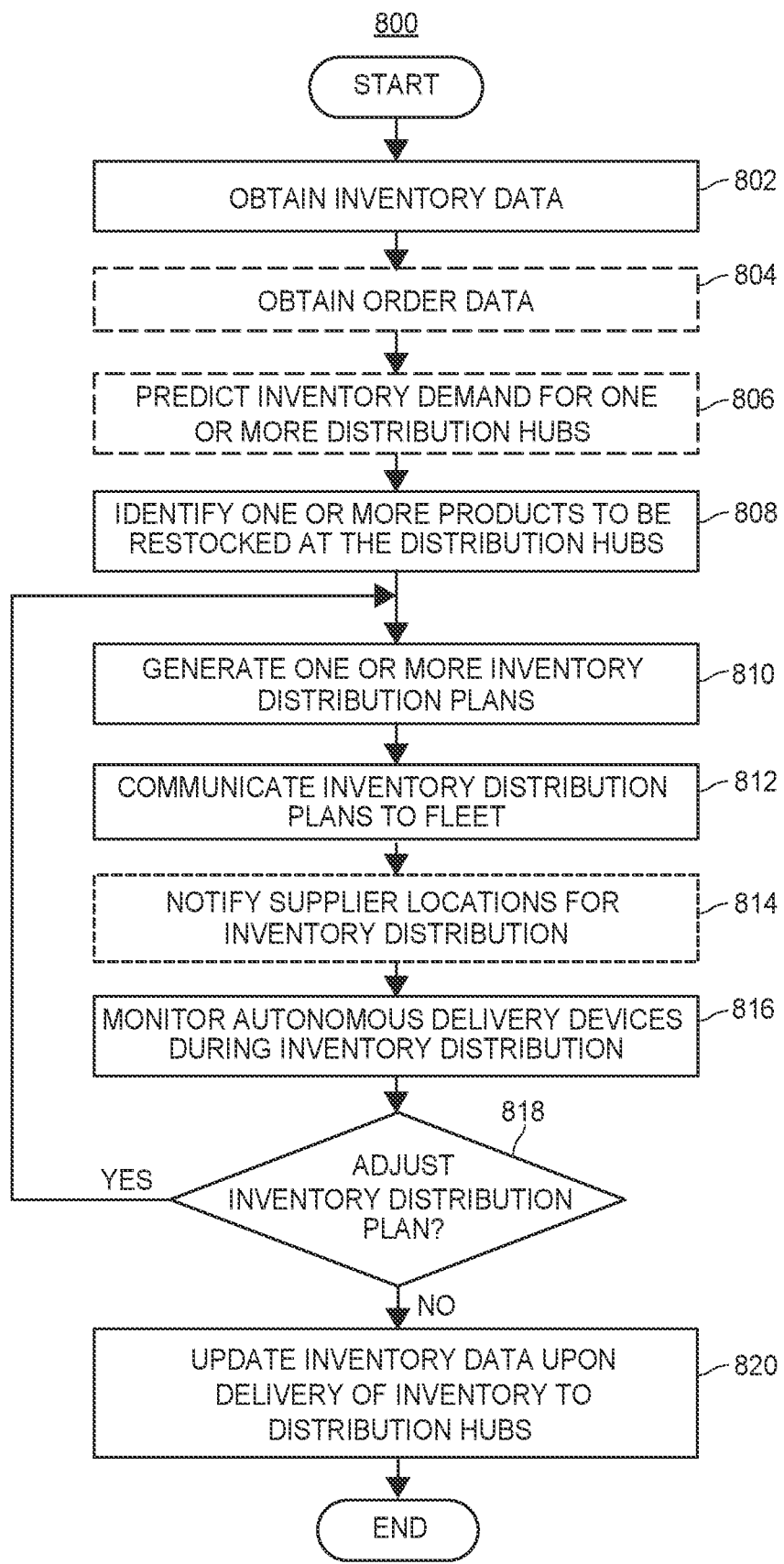
FIG. 8 illustrates a flow diagram of an exemplary inventory management method for managing distribution of inventory to distribution hubs.

FIG. 8 illustrates a flow diagram of an exemplary inventory management method 800 for managing distribution of inventory to distribution hubs (e.g., delivery hubs 110 or regional distribution hubs) by autonomous delivery devices 210 of an automated delivery fleet. The inventory management method 800 is exemplary only, and other methods may include additional, fewer, or alternative actions. The inventory management method 800 may be performed by one or more inventory management engines 330 running on a distribution hub server 244 or a platform server 242.

The inventory management method 800 begins by obtaining inventory data for one or more distribution hubs (block 802). In some embodiments, order data may also be obtained (block 804), and inventory demand may be predicted for one or more distribution hubs (block 806). Based upon the data and any predictions, one or more products are identified for restocking at one or more distribution hubs (block 808). One or more inventory distribution plans to supply the one or more products to the one or more distribution hubs may then be generated (block 810) and communicated to the autonomous delivery devices 210 of the automated delivery fleet (block 812). In some embodiments, notifications may be sent to suppliers to notify the suppliers of inventory distribution plans involving supplier locations (block 814). Operation of the one or more autonomous delivery devices 210 is monitored during distribution of inventory according to the inventory distribution plans (block 816) and, if any adjustments to the inventory distribution plan are needed (block 818), new inventory distribution plans are generated (block 810). Once the inventory has been delivered to the one or more distribution hubs, the inventory data associated with such distribution hubs is updated (block 820).

At block 802, the inventory management engine 330 may obtain inventory data from one or more distribution hubs, such as delivery hubs 110 or regional distribution hubs. In some embodiments, the inventory data may be obtained periodically from inventory management systems associated with the distribution hubs. In further embodiments, the inventory management engine 330 may maintain the inventory data in the inventory management data 334.

At block 804, in some embodiments, the inventory management engine 330 may obtain order data from the fleet management engine 310 or the order management engine 320 to account for planned or predicted orders. In some embodiments, the order data may include both currently pending orders (i.e., ordered placed but not yet delivered) and predicted orders based upon historical demand patterns (e.g., as predicted by the trained ML models). The order data may be stored as inventory management data 334.

At block 806, in some embodiments, the inventory management engine 330 may predict inventory demand for one or more distribution hubs based upon current data and historical demand patterns. Thus, the inventory management engine 330 may apply one or more inventory management models 332 to analyze the inventory management data 334 to generate predictions of inventory demand over a relevant time period (e.g., a predetermined number of hours or the remainder of the current day). Such predicted inventory demand may be further used to determine inventory restocking requirements.

At block 808, the inventory management engine 330 may identify one or more products to restock at the one or more distribution hubs based upon current data and historical patterns. The inventory management engine 330 may analyze the inventory management data 334 using one or more inventory management models 332 to identify the one or more products to be restocked, as well as quantities of such products to be restocked. In addition to the products and the quantity, in some embodiments, the inventory management engine 330 may determine timing for such restocking. In further embodiments, the inventory management engine 330 may use the predicted inventory demand to determine required restocking.

At block 810, one or more inventory distribution plans for restocking the inventory at the one or more distribution hubs may be generated by the inventory management engine 330 or by the fleet management engine 310 based upon indications of restocking requirements received from the inventory management engine 330. The inventory distribution plans may include plans for autonomous delivery devices 210 to obtain additional inventory of the identified products from other distribution hubs or from vendor facilities (e.g., vendor warehouses).

At block 812, the fleet management engine 310 may communicate the inventory distribution plans to the appropriate autonomous delivery devices 210 to direct the autonomous delivery devices 210 to acquire and transfer such inventory to the one or more distribution hubs.

At block 814, in some embodiments, the fleet management engine 310 or the inventory management engine 330 may communicate with one or more supplier locations to notify the supplier locations of the inventory distribution plans. This may include communication with one or more distribution hubs to ready the inventory to be transferred in advance of the arrival of the assigned autonomous delivery devices 210. In some embodiments, the inventory management engine 330 may communicate with one or more vendor computing systems 214 via an inventory management system interface 360 to notify vendors of additional inventory orders and scheduled arrival of autonomous delivery devices 210 to pick up the ordered inventory.

At block 816, the fleet management engine 310 may monitor the autonomous delivery devices 210 associated with the inventory distribution plans during distribution of the inventory. If changes to current conditions occur, the fleet management engine 310 or the inventory management engine 330 may determine adjustments to the inventory distribution plans are needed at block 818. In such instances, new or updated inventory distribution plans may be generated at block 810 and communicated to the autonomous distribution devices 210 at block 812. If no adjustments to the inventory distribution plans are needed, the inventory distribution may continue until the autonomous delivery devices 210 have completed the inventory distribution plans.

At block 820, the inventory management engine 330 may update the inventory data associated with the distribution hubs to reflect the inventory distribution. In some embodiments, updating the inventory data may include communicating with one or more databases 246 associated with delivery network servers 240 that are configured to track inventory at the corresponding distribution hubs, such as delivery hubs 110.

Other Matters

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. For example, a module may comprise dedicated circuitry or logic that is permanently configured (e.g., as a special-purpose processor, such as a field programmable gate array (FPGA) or an application-specific integrated circuit (ASIC) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the one or more processors or processor-implemented modules may be located in a single geographic location (e.g., at a location of a mobile computing device or at a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Such memories may be or may include non-transitory, tangible computer-readable media configured to store computer-readable instructions that may be executed by one or more processors of one or more computer systems.

As used herein any reference to "one embodiment," "an embodiment," or "some embodiments" means that a particular element, feature, structure, or characteristic described in connection with the embodiment is included in at least one embodiment. The appearances of the phrases "in one embodiment," "in an embodiment," "in some embodiments," or similar phrases in various places in the specification are not necessarily all referring to the same embodiment or the same set of embodiments.

Some embodiments may be described using the terms "coupled," "connected," "communicatively connected," or "communicatively coupled." along with their derivatives. These terms may refer to a direct physical connection or to an indirect (physical or communicative) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, "a" or "an" are employed to describe elements and components of the embodiments herein. This is done merely for convenience and to give a general sense of the description. This description, and the claims that follow, should be read to include one or at least one and the singular also includes the plural, unless the context clearly indicates otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for the systems and a methods disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112 (f), unless traditional means-plus-function language is expressly recited, such as "means for" or "step for" language being explicitly recited in the claims. The systems and methods described herein are directed to an improvement to computer functionality, which may include improving the functioning of conventional computers in performing tasks.

What is claimed is:

1. A computer-implemented method for adjusting order delivery fees, the method comprising:

training, by one or more processors, a plurality of machine learning (ML) models for each of a plurality of delivery hubs by performing one or more statistical analyses on one or more sets of historical order data and one or more sets of historical delivery data associated with the respective delivery hub, each of the plurality of ML models being associated with one or more environmental conditions and trained to determine combinations of optimal order delivery fees and optimal delivery times for the respective delivery hub;

receiving, at the one or more processors, a set of order data associated with a particular order by a customer, the order data indicating order details associated with the particular order and customer details associated with the customer;

receiving, at the one or more processors, a set of delivery data associated with the particular order, wherein the delivery data includes data on fleet availability of a fleet of delivery vehicles and expected demand for delivery services at a time of the particular order;

determining, by the one or more processors, a delivery hub from the plurality of delivery hubs to fulfil the particular order based upon the order details and the customer details, wherein the delivery hub is associated with a plurality of delivery vehicles of the fleet of delivery vehicles;

determining, by the one or more processors, one or more current or predicted future conditions associated with the delivery hub, wherein the one or more current or predicted future condition comprise at least one of weather conditions or traffic conditions;

selecting, by the one or more processors, an ML model from the plurality of ML models for the delivery hub based upon a correspondence between the one or more current or predicted future conditions associated with the delivery hub and the one or more environmental conditions associated with the ML model;

loading, by the one or more processors, the set of order data and the set of delivery data associated with the particular order into the ML model;

generating, by the ML model, one or more optimal combinations of variable order delivery fees and delivery times for the particular order by the customer to provide order fulfilment based on the set of order data and the set of delivery data associated with the particular order, wherein the variable order delivery fees are determined based upon the order details of the particular order, availability of the fleet of delivery vehicles at the time of the particular order, and the expected demand for delivery services at the time of the particular order;

communicating, via a user interface, to the customer, one or more options associated with the optimal combinations of variable order delivery fees and delivery times;

receiving, at the one or more processors, a customer selection associated with the one or more options, the customer selection indicating one or more of the delivery times associated with the one or more optimal combinations;

generating, at the one or more processors, a distribution plan for one or more autonomous delivery vehicles of the plurality of delivery vehicles to fulfill the particular order based at least in part upon the set of delivery data and the one or more of the delivery times based on the customer selection and the one or more current or predicted future conditions associated with the delivery hub, the distribution plan including a delivery plan for the one or more of the delivery vehicles to deliver the particular order to a delivery location associated with the customer; and dispatching and controlling, by the one or more processors via a fleet communication interface, the one or more autonomous delivery vehicles to fulfil the particular order according to the distribution plan by the one or more of the delivery times based on the customer selection by:

establishing a communication connection with the one or more autonomous delivery vehicles, controlling operation of the one or more autonomous vehicles along a route according to the distribution plan by transmitting commands to cause the one or more autonomous delivery vehicles to operate autonomously to travel along the route according to the distribution plan, monitoring operation of the one or more autonomous delivery vehicles along the route, and determining fulfilment of the particular order based upon monitoring the operation of the one or more autonomous delivery vehicles.

2. The computer-implemented method of claim 1, wherein all of the plurality of delivery vehicles comprise autonomous delivery vehicles.

3. The computer-implemented method of claim 1, wherein the order data includes data indicative of at least one of:
   date and time of the particular order;
   product inventory status for a product associated with the particular order;
   product weight of a product associated with the particular order;
   customer subscription status of the customer;
   order priority type of the particular order;
   customer order history of the customer; and
   a delivery address for the particular order.

4. The computer-implemented method of claim 1, wherein the data on fleet availability includes data indicative of at least one of:
   current locations of the plurality of the delivery vehicles;
   current operating statuses of the plurality of delivery vehicles;
   current routes being traversed by the plurality of delivery vehicles;
   cargo capacity of the plurality of delivery vehicles;
   expected future locations of the plurality of delivery vehicles;
   expected future operating status of the plurality of delivery vehicles; and
   expected future cargo capacity of the plurality of delivery vehicles.

5. The computer-implemented method of claim 1, wherein the delivery data includes delivery demand data indicative of at least one of:
   total number of queued deliveries;
   number of queued priority deliveries;
   order information of the queued deliveries;
   locations of the queued deliveries; and
   weather and traffic conditions associated with the queued deliveries.

6. The computer-implemented method of claim 1, wherein generating the one or more optimal combinations of variable order delivery fees and delivery times includes analyzing, via the ML model, a plurality of current orders to predict optimal delivery fees for each order of the current orders, wherein each order is delivered within a predefined time period.

7. The computer-implemented method of claim 6, wherein analyzing the plurality of current orders includes predicting future orders placed during the predefined time period.

8. The computer-implemented method of claim 1, wherein determining the one or more optimal combinations of variable order delivery fees and delivery times includes predicting at least one combination of variable order delivery fees and delivery times that includes a monetary incentive for choosing a later delivery time.

9. A computing system for adjusting order delivery fees, comprising:
   one or more processors;
   a communication interface communicatively connected to the one or more processors and configured to communicate with customer computing devices and a fleet of delivery vehicles via a network; and
   one or more non-transitory memories communicatively connected to the one or more processors, storing computer-executable instructions that, when executed by the one or more processors, cause the computing system to:
   train a plurality of machine learning (ML) models for each of a plurality of delivery hubs by performing one or more statistical analyses on one or more sets of historical order data and one or more sets of historical delivery data associated with the respective delivery hub, each of the plurality of ML models being associated with one or more environmental conditions and trained to determine combinations of optimal order delivery fees and optimal delivery times for the respective delivery hub;
   receive a set of order data associated with a particular order by a customer, the order data indicating order details associated with the particular order and customer details associated with the customer;
   receiving, at the one or more processors, a set of delivery data associated with the particular order, wherein the delivery data includes data on fleet availability of the fleet of delivery vehicles and expected demand for delivery services at a time of the particular order;
   determine a delivery hub from the plurality of delivery hubs to fulfil the particular order based upon the order details and the customer details, wherein the delivery hub is associated with a plurality of delivery vehicles of the fleet of delivery vehicles;
   determine one or more current or predicted future conditions associated with the delivery hub, wherein the one or more current or predicted future condition comprise at least one of weather conditions or traffic conditions;
   select an ML model selected from the plurality of ML models for the delivery hub based upon a correspondence between the one or more current or predicted future conditions associated with the delivery hub and the one or more environmental conditions associated with the ML model;
   load the set of order data and the set of delivery data associated with the particular order into the ML model;
   generate one or more optimal combinations of variable order delivery fees and delivery times for the particular order by the customer to provide order fulfilment based on the set of order data and the set of delivery data associated with the particular order via the ML model, wherein the variable order delivery fees are determined based upon the order details of the particular order, availability of the fleet of delivery vehicles at the time of the particular order, and the expected demand for delivery services at the time of the particular order;

communicate one or more options associated with the optimal combinations of variable order delivery fees and delivery times to the customer via the communication interface;

receive a customer selection associated with the one or more options, the customer selection indicating one or more of the delivery times associated with the one or more optimal combinations;

generate a distribution plan for one or more autonomous delivery vehicles of the plurality of delivery vehicles to fulfill the particular order based at least in part upon the set of delivery data and the one or more of the delivery times based on the customer selection and the one or more current or predicted future conditions associated with the delivery hub, the distribution plan including a delivery plan for the one or more of the delivery vehicles to deliver the particular order to a delivery location associated with the customer; and dispatch and control, via the communication interface, the one or more autonomous delivery vehicles to fulfil the particular order according to the distribution plan by the one or more of the delivery times based on the customer selection by:

establishing a communication connection with the one or more autonomous delivery vehicles, controlling operation of the one or more autonomous vehicles along a route according to the distribution plan by transmitting commands to cause the one or more autonomous delivery vehicles to operate autonomously to travel along the route according to the distribution plan, monitoring operation of the one or more autonomous delivery vehicles along the route, and determining fulfilment of the particular order based upon monitoring the operation of the one or more autonomous delivery vehicles.

10. The computing system of claim 9, wherein the executable instructions further cause the computing system to:
generate the order data, the order data including data indicative of at least one of:
date and time of the particular order;
product inventory status for a product associated with the particular order;
product weight of a product associated with the particular order;
customer subscription status of the customer;
order priority type of the particular order;
customer order history of the customer; and
a delivery address for the particular order.

11. The computing system of claim 9, wherein the executable instructions further cause the computing system to:
generate the data on fleet availability, the data on fleet availability including data indicative of at least one of:
current locations of the plurality of the delivery vehicles;
current operating statuses of the plurality of delivery vehicles;
current routes being traversed by the plurality of delivery vehicles;
cargo capacity of the plurality of delivery vehicles;
expected future locations of the plurality of delivery vehicles;
expected future operating status of the plurality of delivery vehicles; and
expected future cargo capacity of the plurality of delivery vehicles.

12. The computing system of claim 9, wherein the executable instructions further cause the computing system to:
generate the delivery data, the delivery data including delivery demand data indicative of at least one of:
total number of queued deliveries;
number of queued priority deliveries;
order information of the queued deliveries;
locations of the queued deliveries; and
weather and traffic conditions associated with the queued deliveries.

13. The computing system of claim 9, wherein the executable instructions that cause the computing system to generate the one or more optimal combinations of variable order delivery fees and delivery times cause the computing system to analyze a plurality of current orders via the ML model to predict optimal delivery fees for each order of a plurality of current orders, wherein each order is delivered within a predefined time period.

14. The computing system of claim 13, wherein the executable instructions that cause the computing system to analyze the plurality of current orders via the ML model further cause the computing system to predict future orders placed during the predefined time period.

15. A tangible, non-transitory computer-readable medium storing executable instructions for adjusting order delivery fees that, when executed by one or more processors of a computing system, cause the computing system to:
train a plurality of machine learning (ML) models for each of a plurality of delivery hubs by performing one or more statistical analyses on one or more sets of historical order data and one or more sets of historical delivery data associated with the respective delivery hub, each of the plurality of ML models being associated with one or more environmental conditions and trained to determine combinations of optimal order delivery fees and optimal delivery times for the respective delivery hub;
receive a set of order data associated with a particular order by a customer, the order data indicating order details associated with the particular order and customer details associated with the customer;
receiving, at the one or more processors, a set of delivery data associated with the particular order, wherein the delivery data includes data on fleet availability of a fleet of delivery vehicles and expected demand for delivery services at a time of the particular order;
determine a delivery hub from the plurality of delivery hubs to fulfil the particular order based upon the order details and the customer details, wherein the delivery hub is associated with a plurality of delivery vehicles of the fleet of delivery vehicles;
determine one or more current or predicted future conditions associated with the delivery hub, wherein the one or more current or predicted future condition comprise at least one of weather conditions or traffic conditions;
select an ML model selected from the plurality of ML models for the delivery hub based upon a correspondence between the one or more current or predicted future conditions associated with the delivery hub and the one or more environmental conditions associated with the ML model;
load the set of order data and the set of delivery data associated with the particular order into the ML model;
generate one or more optimal combinations of variable order delivery fees and delivery times for the particular order by the customer to provide order fulfilment based on the set of order data and the set of delivery data associated with the particular order via the ML model, wherein the variable order delivery fees are determined based upon the order details of the particular order, availability of the fleet of delivery vehicles at the time of the particular order, and the expected demand for delivery services at the time of the particular order;
communicate one or more options associated with the optimal combinations of variable order delivery fees and delivery times to the customer via a communication interface;
receive a customer selection associated with the one or more options, the customer selection indicating one or more of the delivery times associated with the one or more optimal combinations;
generate a distribution plan for one or more autonomous delivery vehicles of the plurality of delivery vehicles to fulfill the particular order based at least in part upon the set of delivery data and the one or more of the delivery times based on the customer selection and the one or more current or predicted future conditions associated with the delivery hub, the distribution plan including a delivery plan for the one or more of the delivery vehicles to deliver the particular order to a delivery location associated with the customer; and
dispatch and control, via the communication interface, the one or more autonomous delivery vehicles to fulfil the particular order according to the distribution plan by the one or more of the delivery times based on the customer selection by:
establishing a communication connection with the one or more autonomous delivery vehicles,
controlling operation of the one or more autonomous vehicles along a route according to the distribution plan by transmitting commands to cause the one or more autonomous delivery vehicles to operate autonomously to travel along the route according to the distribution plan,
monitoring operation of the one or more autonomous delivery vehicles along the route, and
determining fulfilment of the particular order based upon monitoring the operation of the one or more autonomous delivery vehicles.

16. The tangible, non-transitory computer-readable medium of claim 15, wherein the executable instructions further cause the computer system to:

generate the order data, the order data including data indicative of at least one of:
  date and time of the particular order;
  product inventory status for a product associated with the particular order;
  product weight of a product associated with the particular order;
  customer subscription status of the customer;
  order priority type of the particular order;
  customer order history of the customer; and
  a delivery address for the particular order.

17. The tangible, non-transitory computer-readable medium of claim 15, wherein the executable instructions further cause the computing system to:

generate the data on fleet availability, the data on fleet availability including data indicative of at least one of:
  current locations of the plurality of the delivery vehicles;
  current operating statuses of the plurality of delivery vehicles;
  current routes being traversed by the plurality of delivery vehicles;
  cargo capacity of the plurality of delivery vehicles;
  expected future locations of the plurality of delivery vehicles;
  expected future operating status of the plurality of delivery vehicles; and
  expected future cargo capacity of the plurality of delivery vehicles.

18. The tangible, non-transitory computer-readable medium of claim 15, wherein the executable instructions further cause the computing system to:

generate the delivery data, the delivery data including delivery demand data indicative of at least one of:
  total number of queued deliveries;
  number of queued priority deliveries;
  order information of the queued deliveries;
  locations of the queued deliveries; and
  weather and traffic conditions associated with the queued deliveries.

19. The tangible, non-transitory computer-readable medium of claim 15, wherein the executable instructions that cause the computing system to generate the one or more optimal combinations of variable order delivery fees and delivery times cause the computing system to analyze a plurality of current orders via the ML model to predict optimal delivery fees for each order of a plurality of current orders, wherein each order is delivered within a predefined time period.

20. The tangible, non-transitory computer-readable medium of claim 19, wherein the executable instructions that cause the computing system to analyze the plurality of current orders via the ML model further cause the computing system to predict future orders placed during the predefined time period.

* * * * *